US008005762B2

(12) United States Patent
Ogg et al.

(10) Patent No.: US 8,005,762 B2
(45) Date of Patent: Aug. 23, 2011

(54) AUTOMATED HANDLING OF COMPUTER-BASED POSTAGE SYSTEM PRINTING ERRORS

(75) Inventors: Craig L. Ogg, Long Beach, CA (US); Akbar A. Thobhani, Santa Monica, CA (US)

(73) Assignee: Stamps.com Inc., Los Angeles, CA (US)

( * ) Notice: Subject to any disclaimer, the term of this patent is extended or adjusted under 35 U.S.C. 154(b) by 1126 days.

(21) Appl. No.: 10/922,334

(22) Filed: Aug. 20, 2004

(65) Prior Publication Data

US 2006/0041519 A1 Feb. 23, 2006

(51) Int. Cl.
*G06Q 30/00* (2006.01)
*G06F 17/00* (2006.01)

(52) U.S. Cl. ........ 705/340; 705/401; 705/402; 705/408; 705/410

(58) Field of Classification Search ........................ None
See application file for complete search history.

(56) References Cited

U.S. PATENT DOCUMENTS

| | | | |
|---|---|---|---|
| 5,262,623 A | 11/1993 | Batterman et al. |
| 5,510,992 A | 4/1996 | Kara |
| 5,573,277 A | 11/1996 | Petkovsek |
| 5,612,889 A | 3/1997 | Pintsov et al. |
| 5,626,286 A | 5/1997 | Petkovsek |
| 5,682,318 A | 10/1997 | Kara |
| 5,717,597 A | 2/1998 | Kara |
| 5,737,729 A | 4/1998 | Denman |
| 5,801,944 A | 9/1998 | Kara |
| 5,812,991 A | 9/1998 | Kara |
| 5,848,401 A | 12/1998 | Goldberg |
| 5,923,406 A | 7/1999 | Brasington et al. |
| 6,005,945 A | 12/1999 | Whitehouse |
| 6,010,156 A | 1/2000 | Block |
| 6,192,165 B1 | 2/2001 | Irons |
| 6,208,980 B1 | 3/2001 | Kara |
| 6,244,763 B1 | 6/2001 | Miller |
| 6,296,404 B1 | 10/2001 | Pierce et al. |
| 6,415,983 B1 | 7/2002 | Ulvr et al. |

(Continued)

FOREIGN PATENT DOCUMENTS

WO 0049580 A1 8/2000

OTHER PUBLICATIONS

"Stamps.com to Pilot a New PC Postage Product.", ePostal News, Aug. 2, 2004.*

(Continued)

*Primary Examiner* — Rutao Wu
(74) *Attorney, Agent, or Firm* — Khorsandi Patent Law Group, A Law Corporation; Marilyn R. Khorsandi

(57) ABSTRACT

The exemplary embodiment of the present invention provides a method for handling printing errors in a computer-based postage system, the method comprising: assigning an identifier to a particular mail piece wherein said identifier uniquely identifies the particular mail piece during a particular period of time and wherein said unique mail piece identifier is related to a particular mailer; generating for printing a representation of a postage indicium for the particular mail piece and a representation of the unique mail piece identifier; and recognizing an indication that an error occurred in a printing of at least one of the postage indicium or the representation of the unique mail piece identifier.

18 Claims, 9 Drawing Sheets

U.S. PATENT DOCUMENTS

| | | | |
|---|---|---|---|
| 6,419,782 B1 | 7/2002 | Johnson et al. | |
| 6,424,954 B1 | 7/2002 | Leon | |
| 6,427,021 B1 | 7/2002 | Fischer et al. | |
| 6,461,063 B1 | 10/2002 | Miller | |
| 6,505,179 B1 | 1/2003 | Kara | |
| 6,505,980 B1 | 1/2003 | Allday | |
| 6,557,755 B1 | 5/2003 | Pickering et al. | |
| 6,592,027 B2 | 7/2003 | Kovlakas | |
| 6,594,374 B1 | 7/2003 | Beckstrom et al. | |
| 6,655,579 B1 | 12/2003 | Delman et al. | |
| 6,687,684 B1 | 2/2004 | Whitehouse | |
| 6,701,304 B2 | 3/2004 | Leon | |
| 6,722,563 B1 | 4/2004 | Johnson et al. | |
| 6,722,565 B2 | 4/2004 | Takeuchi et al. | |
| 6,735,575 B1 | 5/2004 | Kara | |
| 6,820,201 B1 | 11/2004 | Lincoln et al. | |
| 6,834,273 B1 | 12/2004 | Sansone et al. | |
| 7,069,253 B2 | 6/2006 | Leon | |
| 7,085,725 B1 | 8/2006 | Leon | |
| 7,117,363 B2 | 10/2006 | Lincoln et al. | |
| 7,149,726 B1 | 12/2006 | Lingle et al. | |
| 7,162,460 B2 | 1/2007 | Cleckler et al. | |
| 7,191,158 B2 | 3/2007 | Ogg et al. | |
| 7,194,957 B1 | 3/2007 | Leon et al. | |
| 7,243,842 B1 | 7/2007 | Leon et al. | |
| 7,778,939 B2 | 8/2010 | Ogg et al. | |
| 7,818,269 B2 | 10/2010 | Ogg et al. | |
| 7,831,518 B2 | 11/2010 | Montgomery et al. | |
| 7,831,524 B2 | 11/2010 | Whitehouse | |
| 2002/0023057 A1 | 2/2002 | Goodwin et al. | |
| 2002/0046195 A1 | 4/2002 | Martin et al. | |
| 2002/0051205 A1 | 5/2002 | Teranishi et al. | |
| 2002/0073039 A1* | 6/2002 | Ogg et al. | 705/60 |
| 2002/0083020 A1 | 6/2002 | Leon | |
| 2002/0083021 A1 | 6/2002 | Ryan, Jr. et al. | |
| 2003/0037008 A1 | 2/2003 | Raju | |
| 2003/0046103 A1 | 3/2003 | Amato et al. | |
| 2003/0089765 A1* | 5/2003 | Kovlakas | 235/375 |
| 2003/0101143 A1 | 5/2003 | Montgomery et al. | |
| 2003/0101147 A1* | 5/2003 | Montgomery et al. | 705/402 |
| 2003/0101148 A1* | 5/2003 | Montgomery et al. | 705/404 |
| 2003/0177021 A1 | 9/2003 | Dutta | |
| 2003/0217017 A1 | 11/2003 | Willoughby et al. | |
| 2004/0044586 A1* | 3/2004 | Gullo et al. | 705/26 |
| 2004/0215478 A1 | 10/2004 | Baker et al. | |
| 2005/0065892 A1* | 3/2005 | Ryan et al. | 705/62 |
| 2005/0065897 A1 | 3/2005 | Ryan, Jr. et al. | |
| 2005/0125367 A1 | 6/2005 | Ogg et al. | |
| 2005/0144145 A1 | 6/2005 | Ogg et al. | |
| 2005/0195214 A1 | 9/2005 | Reid et al. | |
| 2006/0020505 A1 | 1/2006 | Whitehouse | |
| 2006/0095391 A1* | 5/2006 | Cordery et al. | 705/402 |
| 2007/0100672 A1 | 5/2007 | McBrida et al. | |
| 2008/0007625 A1 | 1/2008 | Reid et al. | |

OTHER PUBLICATIONS

Watson, Neva, "Changes to the Domestic Mail Manuel to Implement Confirm ®—Service," Postal Service Rules and Regulations, Aug. 15, 2002, pp. 1-12, 39 CFR, Part 111, United States Postal Service.

Notice of Allowance for co-pending case U.S. Appl. No. 10/197,044, dated Nov. 24, 2008, pp. 1-10, USPTO.

Office Action for co-pending case U.S. Appl. No. 10/747,936, dated Sep. 18, 2008, pp. 1-39, USPTO.

Office Action for co-pending case U.S. Appl. No. 10/731,992, dated May 28, 2008, pp. 1-18, USPTO.

Office Action for co-pending case U.S. Appl. No. 10/731,992, dated Jan. 21, 2009, pp. 1-31, USPTO.

Notice of Allowance for U.S. Appl. No. 10/688,548, dated Sep. 5, 2006, pp. 1-8, USPTO.

Notice of Allowance for U.S. Appl. No. 10/994,768, dated Jan. 5, 2007, pp. 1-8, USPTO.

Notice of Allowance for co-pending case U.S. Appl. No. 11/635,871, dated Nov. 17, 2008, pp. 1-12, USPTO.

Office Action for co-pending case U.S. Appl. No. 10/747,936, dated Apr. 13, 2009, pp. 1-52, USPTO.

Office Action for co-pending case U.S. Appl. No. 10/731,992, dated Jul. 29, 2009, pp. 1-37, USPTO.

JP Leon, U.S. Appl. No. 12/316,542, filed Dec. 11, 2008, Specification pp. 1-58, Figures 1-16.

Office Action for co-pending case U.S. Appl. No. 10/747,936, dated Aug. 18, 2009, pp. 1-42, USPTO.

"Need more trackits?", 4 pages, http://www.trackmymail.com, 8341 Beechcraft Ave., Gaithersburg, MD 20879, 888-444-9972 or 310-924-2373, not dated.

"Direct Mail Tracking Online, Real-Time at Your Fingertips", 18 pages, http://www.trackmymail.com/, printed Dec. 3, 2003.

Endicia Internet Postage, 3 pages, http://www.endicia.com/, printed Dec. 29, 2003.

STAMPS.COM Inc., Santa Monica, CA 90405, Stamps.com 3-part Multi-Purpose Labels SDC-3100, 1 Page.

STAMPS.COM Inc., Santa Monica, CA 90405, Stamps.com 2-part Window Envelope Labels SDC-2300, 1 Page.

United States Patent Office; Office Action dated Mar. 9, 2007 for Ogg et al.; Outbound Mail Piece Tracking; U.S. Appl. No. 10/747,936, filed Dec. 29, 2003.

United States Patent Office; Office Action dated Feb. 26, 2008 for Ogg et al.; Outbound Mail Piece Tracking; U.S. Appl. No. 10/747,936, filed Dec. 29, 2003.

United States Patent Office; Office Action dated Apr. 16, 2007 for Ogg et al.; Computer Postage and Mail Tracking Labels; U.S. Appl. No. 10/731,992, filed Dec. 8, 2003.

United States Patent Office; Office Action dated Nov. 1, 2007 for Ogg et al.; Computer Postage and Mail Tracking Labels; U.S. Appl. No. 10/731,992, filed Dec. 8, 2003.

JP Leon, "Systems and Methods for Facilitating Replacement of Computer-Based Value-Bearing Items," U.S. Appl. No. 12/316,240, filed Dec. 9, 2008, pp. 1-155 (including specification pp. 1-104, claims pp. 105-115, abstract p. 116 and drawings pp. 117-155).

John Roland Clem, "Rolls of Image-Customized Value-Bearing Items and Systems and Methods for Providing Rolls of Image-Customized Value-Bearing Items," U.S. Appl. No. 12/943,519, filed Nov. 10, 2010, pp. 1-70 (including preliminary amendment pp. 1-8, specification pp. 9-54, claims pp. 55-59, abstract p. 60 and drawings pp. 61-70).

Office Action for U.S. Appl. No. 12/316,542, dated Mar. 30, 2011, pp. 1-37, USPTO.

* cited by examiner

| 1021 DATE PRINTED | 1022 POSTMARK DATE | 1023 ADDRESSEE/ ADDRESS | 1024 MAIL CLASS | 1029 SVC OPTION | 1025 POSTAGE | 1026 WEIGHT | 1027 REPRINT? | 1028 REFUND? |
|---|---|---|---|---|---|---|---|---|
| 1021-1 MM/DD/YYYY | 1022-1 MM/DD/YYYY | 1023-1 JOHN DOE 111 AVE OF STARS | 1024-1 FIRST CLASS | 1029-1 TRACK-IT | 1025-1 $9.99 | 1026-1 0lb 1oz | 1027-1 ? | 1028-1 |
| 1021-2 MM/01/YYYY | 1022-2 MM/01/YYYY | 1023-2 JOHN DOE 111 AVE OF STARS | 1024-2 FIRST CLASS | 1029-2 TRACK-IT | 1025-2 $9.99 | 1026-2 0lb 1oz | 1027-2 | 1028-2 ? |
| 1021-3 MM/01/YYYY | 1022-3 MM/DD/YYYY | 1023-3 JOHN DOE 111 AVE OF STARS | 1024-3 FIRST CLASS | 1029-3 TRACK-IT | 1025-3 $9.99 | 1026-3 0lb 1oz | 1027-3 ? | 1028-3 |
| 1021-4 MM/DD/YYYY | 1022-4 MM/DD/YYYY | 1023-4 JANE DOE 112 AVE OF STARS | 1024-4 FIRST CLASS | | 1025-4 $0.37 | 1026-4 0lb 1oz | 1027-4 | 1028-4 |

1020 PRINT HISTORY — CURRENT DATE: MM/DD/YYYY

FIG. 7

AUTOMATED HANDLING OF COMPUTER-BASED POSTAGE SYSTEM PRINTING ERRORS

CROSS REFERENCE TO RELATED APPLICATIONS

The entire contents and disclosure of co-pending and related U.S. patent application Ser. No. 10/747,936, titled "OUTBOUND MAIL PIECE TRACKING", filed on Dec. 29, 2003, to be commonly assigned, and U.S. patent application Ser. No. 10/731,992, titled "COMPUTER POSTAGE AND MAILING TRACKING LABELS", filed on Dec. 8, 2003, to be commonly assigned, is hereby expressly incorporated by reference for all purposes as if fully set forth herein.

The entire contents and disclosures of co-pending and related, U.S. patent application Ser. No. 10/197,044, titled "GENERIC VALUE BEARING ITEM LABEL", filed Jul. 16, 2002, to be commonly assigned, U.S. patent application Ser. No. 09/905,329, filed Jul. 13, 2001, titled "WEB-ENABLED VALUE BEARING ITEM PRINTING", to be commonly assigned, and U.S. patent application Ser. No. 09/585,025, filed Jun. 1, 2000 and titled "ON-LINE VALUE BEARING ITEM PRINTING", to be commonly assigned, are hereby expressly incorporated by reference for all purposes as if fully set forth herein.

FIELD OF THE INVENTION

The field of the present invention is postal systems, and particularly, computer-based postage systems.

BACKGROUND OF THE INVENTION

An example software-based, on-line postage system is described in U.S. patent application Ser. No. 09/163,993 filed on Sep. 29, 1998, titled "On Line Postage System", the contents of which are hereby incorporated by reference for all purposes as if fully set forth herein. As therein disclosed, an exemplary on-line postage system software comprises user code, or client software, that resides on each client system accessing an on-line postage enabled server system; controller code resides on the on-line postage enabled server system. An exemplary on-line postage system may comprise a user/client system electronically connected to a server system, which in turn is connected to a USPS system. The server system is preferably capable of communicating with one or more client systems simultaneously.

An on-line postage system may be used to print Value Bearing Items ("VBI") in the form of postage indicia. VBI are not limited to postage and can as well include, among other things, coupons, tickets, gift certificates, currency, money orders, vouchers and the like. An on-line postage system is sometimes referred to as a Computer Postage System, or a PC Postage System. The terms Computer Postage and PC Postage are used equivalently herein.

The United States Postal Service (USPS) provides the Information Based Indicia Program (IBIP.) The IBIP facilitates PC-based (Personal Computer based) Postage, also sometimes referred to as computer-based, or Internet-based, Postage. With PC Postage, a user can purchase postage credit, and print the postage in the form of PC Postage onto a label or directly onto a mail piece. A PC Postage label provides a human-readable portion and a two-dimensional barcode portion. The human-readable portion includes the postage value, mail class, the date, and optionally a logo. The barcode portion is intended to help thwart fraud, and includes information about the mail piece including the destination ZIP code, the amount of postage applied, the date and time the postage was applied, and a digital signature so that the USPS can validate the authenticity of the postage.

In order to print VBI indicia, such as postage stamps, using an exemplary software-based on-line VBI indicia system, a user first registers (a one-time event) with the system; in the case of postage, the user obtains a license from the USPS to print postage. In operation, a licensed and registered client of the on-line postage system sends a request for authorization to print a desired amount of postage. A postal security device (PSD) server determines whether the client's account balance is sufficient to cover the requested amount of postage, and if so, communicates an authorization to the client system. The client system then sends image information for printing a postage indicium for the granted amount to a printer so that the postage indicium is printed on the print media such as, for example, a label. Once the postage information is printed on an individual label it may be subsequently placed on an individual mail piece with a recipient of the user's choosing and mailed and processed by the USPS.

In one exemplary embodiment of PC Postage, a user subscribes to a third party Internet postage provider, such as, for example, Stamps.com Inc. (of Los Angeles, Calif.), and by using postage software made available by the Internet postage provider, postage value can be downloaded to the user's computer. The user can then print the postage indicia, by an ordinary laser or ink jet printer, directly onto the mail piece itself (e.g., onto business envelopes), onto a label to be applied to the mail piece, or alternately on an insert that can be placed into a window envelope so that it will show through a window envelope. Such postage software preferably works in conjunction with other software programs, such as word processing, accounting, database, and contact management software to allow a user to conveniently print PC Postage at the same time that addressee and barcode information is printed, and, in some cases of envelope printing, at the same time as the sender's return address is printed.

An example of a computer-based postage system is the software-based, online postage system described in U.S. patent application Ser. No. 09/163,993 filed on Sep. 29, 1998, by Mohan Ananda, entitled "On Line Postage System", the contents of which were previously incorporated by reference as if set forth herein in full. The online postage system software may comprise user code, also sometimes referred to as client software, that resides on a client system, and controller code, also sometimes referred to as server software, that resides on a server system. An exemplary on-line postage system may comprise a user system electronically connected to a server system, which in turn is connected to a USPS system. The server system is preferably capable of communicating with one or more client systems simultaneously.

Because postage indicium bearing labels have value, various controls are used to guard against fraud. For example, in the case of First Class PC Postage, if an error or other problem occurs (a "misprint") with the printing of a postage indicium bearing PC Postage label, a rigorous procedure with various checks and balances has been used to guard against issuance of improper refunds. The reason that First Class PC Postage misprint refunds have been rigorously controlled is because individual First Class PC Postage labels have not been uniquely identifiable.

In contrast to non-unique First Class PC Postage, misprints of some other types of PC Postage, such as misprints of Express Mail, Delivery Confirmation and Signature Confirmation PC Postage, can be reprinted. That is because Express Mail, Delivery Confirmation and Signature Confirmation PC Postage is uniquely identifiable, at least within a specified period of time, such as one year. Because such PC Postage is uniquely identifiable, the USPS can determine whether or not the postage has been used—that is, if a particular, uniquely identifiable type of PC Postage is improperly reprinted, and if both the original "misprinted" postage as well as the reprinted postage are used, the USPS will be able to determine that the same unique PC Postage was applied to mail pieces processed by the USPS. In other words, the USPS would know if a user used the same uniquely identifiable postage twice. The reason that the USPS will know that such postage has been used twice is because the USPS scans mail pieces with uniquely identifiable Express Mail, Delivery Confirmation and Signature Confirmation tracking numbers upon delivery.

In contrast, First Class postage has not been uniquely identifiable. Because there has not been a unique tracking number for First Class postage bearing mail pieces, such mail pieces have not been scanned upon delivery. Therefore, the USPS would not know if the user had applied both an original, but claimed misprinted First Class postage label, as well as the reprinted postage to one or more mail pieces in the postal stream. Because the USPS had no way of automatically determining whether or not First Class PC Postage was being improperly reprinted, the USPS has imposed rigorous procedures for controlling misprint claims.

Presently, if a First Class postage indicium bearing PC Postage label misprint occurs, the PC Postage user is not allowed to simply "reprint" the label. Instead, the PC Postage user must complete a form (referred to herein as a "Misprint claim") within a certain number of days from the date of the claimed misprint, provide the physical evidence of the misprint, and submit the completed form with the physical evidence to the PC Postage service provider. Notably, unless the PC Postage user self-delivers the Misprint claim, the PC Postage user must apply appropriate postage to submit the Misprint claim to the PC Postage service provider.

When the PC Postage service provider receives a Misprint claim, the PC Postage service provider must maintain the Misprint claim in a secure area. The PC Postage service provider must examine each Misprint claim and the corresponding physical evidence. If the PC Postage service provider determines that a refund is appropriate, the PC Postage service provider must, from its own account, advance a refund to the claiming user.

At various intervals, a United States Postal Service ("USPS") representative audits refunds made by the PC Postage service provider and determines a statistically representative amount that reflects the percentage of properly made refunds. The USPS representative calculates a refund reimbursement amount, which is usually less, and sometimes substantially less, than the amount of refunds actually advanced by the PC Postage service provider. After the USPS processes the calculated refund amount, the USPS issues a reimbursement to the PC Postage service provider.

Because of the rigorous PC Postage procedure, some users who experience misprints are reticent to go through the process of completing a Misprint claim form, and paying postage to submit the Misprint claim and the physical misprint evidence—at least unless the amount of the misprinted PC Postage indicium exceeds an amount that the particular user determines is sufficient to justify the process.

The PC Postage service provider, in order to keep its users satisfied, may err on the side of over-refunding. As a result, the USPS calculated refund reimbursement amount can be substantially less than the actual amount refunded by the PC Postage service provider. That is, the PC Postage service provider may lose money on the refund advances made to its users.

Further, in order to keep its users satisfied, the PC Postage service provider must devote the resources necessary to timely evaluate all Misprint claims. Because the process requires manual intervention, in addition to the amount of the refund advance loss suffered by the PC Postage service provider, the PC Postage service provider must pay someone, such as with salary, to examine the Misprint claims. Further, the PC Postage service provider must allocate space, and make provisions to secure the allocated space, to house the Misprint claims.

A better way is needed to process PC Postage misprints. In order to provide a better way of refunding PC Postage misprints, one way involves providing the USPS with a way to determine whether a user has used both the "original" and the "reprinted" First Class PC Postage. One way in which to do that, described below in some detail, uses elements of a postal product known as the CONFIRM® service.

CONFIRM® service is a product offered by the United States Postal Service. U.S. Postal Service *Publication* 197 ("*Publication* 197") describes in detail various aspects of the CONFIRM® service and CONFIRM® service interfaces; *Publication* 197 is incorporated by reference in full herein for all purposes as if fully stated herein.

CONFIRM® is a mail tracking service of PLANET™ Codes that provides electronic tracking information to USPS customers about their First-Class, Standard letter-size, flat mail and periodicals. CONFIRM® provides advance delivery information about incoming hard-copy reply mail ("Origin CONFIRM") and outbound mail ("Destination CONFIRM").

In order to track mail, CONFIRM® currently uses a combination of two tracking numbers: a 5- or 11-digit POSTNET (POSTal Numeric Encoding Technique) Code and a 12- or 14-digit PLANET™ Code. Currently, the POSTNET and PLANET™ Codes must be encoded as a barcode and applied to the mail piece.

In order to facilitate mail handling and optical reading equipment processing of mail by the USPS and to properly interpret PC Postage, addressee information, and CONFIRM® tracking information, postage indicia and related labels need to be applied according to USPS guidelines. USPS guidelines directed to the margins, label sizes, and placement of Postage Indicia, and the size, placement, and other characteristics of POSTNET and PLANET™ barcodes, and any facing identification mark (FIM) on mail pieces are described in the Domestic Mail Manual (DMM) and Title 39, Code of Federal Register (CFR), Part 111, the contents of which are incorporated by reference in full herein for all purposes.

As each mail piece progresses through to its destination, the CONFIRM® barcode on each mail piece is scanned at the different USPS processing facilities through which it passes. Electronic information for each scan is captured and is sent to a centralized network service, which collects the scan data and packages it for use by USPS customers. The electronic scan information is then electronically transferred from the centralized network and is made available in two ways: through accessing a PLANET™ Code website or via transmission of electronic files sent to subscribing USPS customers.

CONFIRM®-barcoded mail pieces are scanned during the passage of the mail piece through various USPS processing facilities, but are not scanned (unless accompanied by Delivery Confirmation, Signature Confirmation, or similar final mail piece disposition service) upon actual delivery.

A POSTNET Code identifies a particular delivery address. A PLANET™ Code identifies a particular CONFIRM® Subscriber's mailing. If more than one mail piece in a single mailing is addressed to the same delivery address, then the CONFIRM® Service does not provide individual mail piece tracking.

The CONFIRM® service was designed to serve the high-volume mailer such as telemarketers and other businesses. High-volume mailers can benefit from tracking outbound mailings. For example, information about customer receipt of certain mailings would allow mailers to plan subsequent business activities, such as synchronizing telemarketing efforts with delivery of solicitations, or augmenting direct mail pieces with other advertising media.

The high-volume mailer basis for the CONFIRM® service is evident from the subscription fee structure charged by the U.S. Postal Service. The subscription fees, ranging from $2,000 for a three-month period, to an annual $10,000 fee, are based on the number of scans, measured in the millions.

Although large mailings are not normally the concern of individuals, individuals with low volume mailings could benefit from the ability to track processing and delivery of individual mail pieces. Low volume mailers will not be motivated to pay the high subscription fees for the U.S. Postal CONFIRM® Service. Even if they paid such fees, the CONFIRM® Service does not guarantee tracking of individual mail pieces.

Various private carriers provide individual parcel tracking, for a piece-based premium. And yet, no mail piece tracking is available for letters mailed using First Class U.S. postage.

DELIVERY CONFIRMATION is another service provided by the U.S. Postal Service. DELIVERY CONFIRMATION provides the date, time and ZIP Code of delivery or attempted delivery. DELIVERY CONFIRMATION can be purchased for PRIORITY MAIL® items, Package Services parcels, STANDARD MAIL® parcels, and FIRST-CLASS MAIL® parcels, but is not available for use with FIRST-CLASS MAIL® letters.

In order to provide the USPS with a way to determine whether a user has used both the "original" and the "reprinted" First Class PC Postage, a way is needed to uniquely identify First Class PC Postage and automatically process First Class PC Postage refund claims.

SUMMARY OF THE INVENTION

Although the exemplary embodiment of the present invention is sometimes described herein with specific reference to first class mail pieces, it will be understood by someone with ordinary skill in the art that the present invention would apply equally to other classes of mail as long as the USPS or other postal service provides the CONFIRM® service, or a service such as, or similar to, CONFIRM® for that class of mail.

It will be understood by someone with ordinary skill in the art that Express Mail, and mail pieces for which Delivery Confirmation or Signature Confirmation has been purchased, are assigned a unique tracking identifier with which a postal customer can track the delivery of the particular mail piece. However, in the case of Delivery Confirmation or Signature Confirmation pieces, only actual delivery, not entry into or progress through the postal system, can be tracked by virtue of the Delivery Confirmation or Signature Confirmation identifier.

Further, it will be understood by someone with ordinary skill in the art that, currently, in the case of PC Postage, Express Mail PC Postage is not specifically related in a computer system to a particular Express Mail Serial Number, but rather, is related to a date and delivery address. Therefore, entry of a particular Express Mail Serial Number into the postal process is no guarantee that Express Mail PC Postage has entered into the postal stream. Further, in the case of PC Postage for Express Mail, Delivery Confirmation and Signature Confirmation pieces, although the PC Postage label itself is related to a particular mailer, the Express Mail, Delivery Confirmation or Signature Confirmation tracking number for the particular piece of mail is not related to a particular mailer.

The exemplary embodiment of the present invention provides a method for handling printing errors in a computer-based postage system, the method comprising: assigning an identifier to a particular mail piece wherein said identifier uniquely identifies the particular mail piece during a particular period of time and wherein said unique mail piece identifier is related to a particular mailer; generating for printing a representation of a postage indicium for the particular mail piece and a representation of the unique mail piece identifier; and recognizing an indication that an error occurred in a printing of at least one of the postage indicium or the representation of the unique mail piece identifier. The method provided by exemplary embodiment of the present invention for handling printing errors further comprises: either regenerating for printing the representation of the postage indicium for the particular mail piece and the representation of the unique mail piece identifier; or refunding a postage amount associated with the postage indicium.

The exemplary embodiment of the present invention provides a further method for handling printing errors in a computer-based postage system, the method comprising: assigning an identifier to a particular mail piece wherein said identifier uniquely identifies the particular mail piece during a particular period of time and wherein said identifier, sometimes referred to herein as the composite CONFIRM® ID (or as the composite confirm ID, or, as the CCID), comprises a subscriber identifier, a mailing identifier, and a delivery address identifier, wherein the combination of the subscriber identifier, the mailing identifier and the delivery address identifier is unique; relating the unique mail piece identifier to a particular mailer; generating for printing a representation of a postage indicium for the particular mail piece and a representation of the unique mail piece identifier; and recognizing an indication that an error occurred in a printing of at least one of the postage indicium or the representation of the unique mail piece identifier. The further method provided by exemplary embodiment of the present invention for handling printing errors further comprises: either regenerating for printing the representation of the postage indicium for the particular mail piece and the representation of the unique mail piece identifier; or refunding a postage amount associated with the postage indicium.

The exemplary embodiment of the present invention provides a still further method for handling printing errors in a computer-based postage system, the method comprising: receiving a postage printing request from a particular mailer, said postage printing request comprising a delivery address; formulating a unique mail piece identifier, said unique mail piece identifier, sometimes referred to herein as the composite CONFIRM® ID (or as the composite confirm ID, or, as the CCID), comprising: a subscriber identifier, a mailing identifier; and a set of delivery address information, wherein a combination of the subscriber identifier, the mailing identifier and the set of delivery address information is unique; relating the unique mail piece identifier to a particular mailer; printing a postage indicium in accordance with the postage printing request; and recognizing an indication that an error occurred in a printing of the postage indicium. The still further method provided by exemplary embodiment of the present invention for handling printing errors further comprises: either regenerating for printing the representation of the postage indicium for the particular mail piece and the representation of the unique mail piece identifier; or refunding a postage amount associated with the postage indicium.

It will be understood by someone of ordinary skill in the art that the exemplary embodiments of the present invention described herein are described with reference to the current data representation schemes and operational implementation by the USPS of the CONFIRM® service. It will understood by someone with ordinary skill in the art that, even though the exemplary embodiments of the present invention described herein are described with reference to the current data representation schemes and operational implementation by the USPS of the CONFIRM® service, the present invention is not limited by the current data representation schemes and operational implementation by the USPS of the CONFIRM® service. Rather, the present invention will apply to other data representation schemes and operational implementations of the CONFIRM® service and other similar services.

BRIEF DESCRIPTION OF THE DRAWINGS

These and other features, aspects, and advantages of the present invention will become better understood with regard to the following description, appended claims, and accompanying drawings in which:

FIG. 7 is a graphic representation depicting an exemplary Print History report for a particular user in an exemplary embodiment of the present invention.

DETAILED DESCRIPTION OF THE INVENTION

In the exemplary embodiment of the present invention, an exemplary PC Postage service provider is a CONFIRM® Service subscriber. In the exemplary embodiment, the exemplary PC Postage service provider obtains at least one subscriber identifier, such as by, among other things, paying the appropriate CONFIRM® Service subscription fee.

The exemplary PC Postage service provider/CONFIRM® Service subscriber then resells CONFIRM® Service access to PC Postage service users, who are sometimes also referred to herein as mailers, or as individual mailers. Depending on the number of customers that use the exemplary CONFIRM® Service subscriber's services, the exemplary CONFIRM® Service subscriber may obtain a plurality of subscriber identifiers.

Although the exemplary PC Postage service provider described herein is a CONFIRM® Service subscriber reseller, it will be understood by someone with ordinary skill in the art that the exemplary CONFIRM® Service subscriber reseller mail piece identification embodiment of the present invention is illustrative and non-limiting, and that the present invention will be equivalently applicable to non-reseller embodiments.

Figure 2:
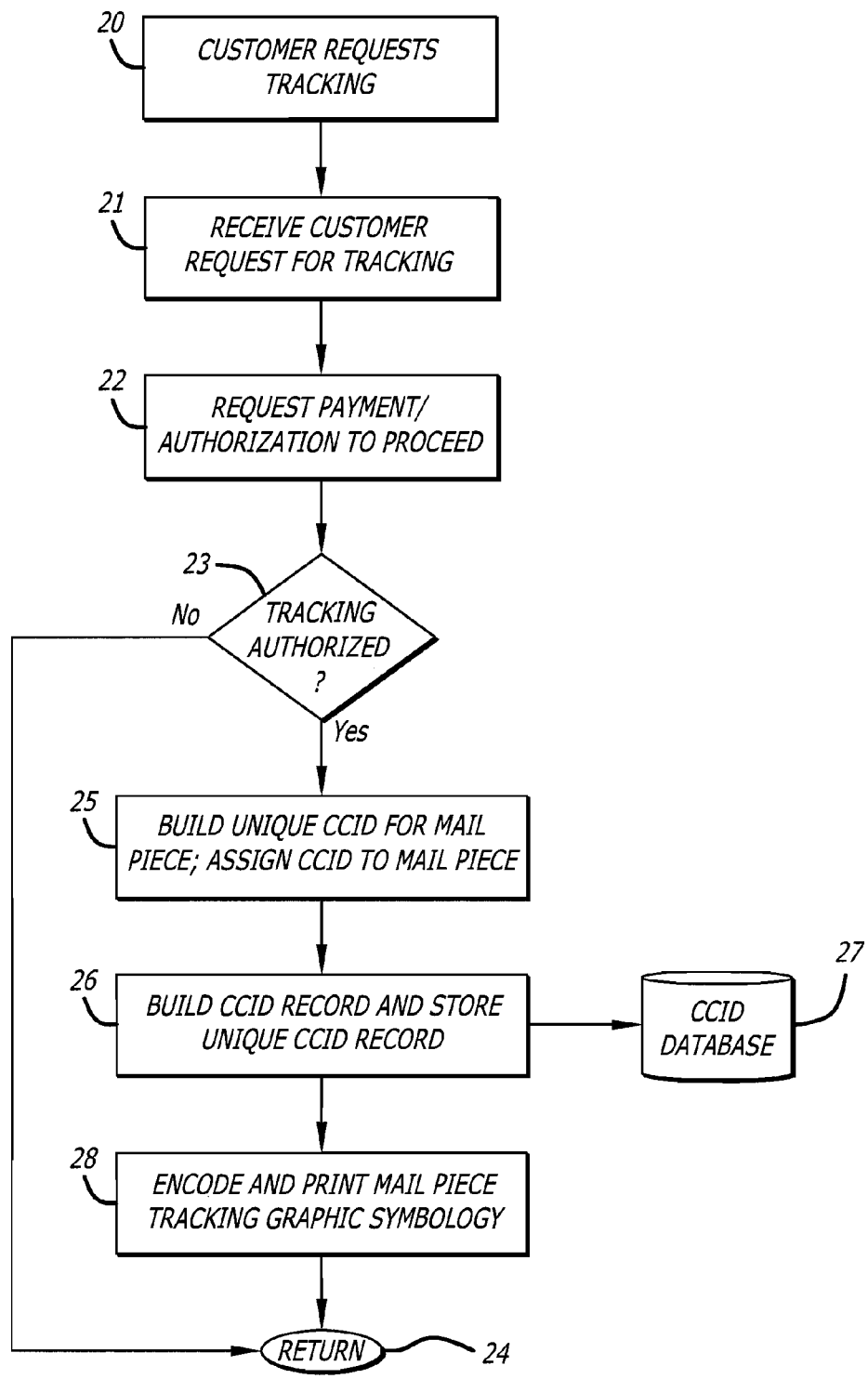
FIG. 2 is a high level logic flow diagram depicting an exemplary process for building and storing a unique mail piece tracking identifier in an exemplary embodiment of the present invention.

FIG. 2 is a high level logic flow diagram depicting an exemplary process for building and storing a unique mail piece tracking identifier (sometimes also referred to herein as a "unique mail piece identifier", or as a "mail piece identifier") in an exemplary embodiment of the present invention. As depicted in function block 20 of FIG. 2, a customer of the exemplary CONFIRM® Service subscriber reseller mail piece tracking provider requests that a particular mail piece be tracked. For each such mail piece requested by a customer to be tracked, the exemplary CONFIRM® Service subscriber reseller mail piece tracking provider computer system receives the customer's request, as depicted in function block 21 of FIG. 2, and will request from the customer payment and authorization to proceed, as depicted in function block 22 of FIG. 2, before proceeding to build a unique mail piece tracking identifier.

The exemplary embodiment of the present invention described herein is an Internet application of the present invention that is implemented in an online Internet-based (or PC-based) postage system. It will be understood by someone with ordinary skill in the art that the exemplary Internet embodiment of the present invention is illustrative and non-limiting, and that the present invention will be equivalently applicable to non-Internet embodiments, and in contexts other than an Internet-based tracking service provider, including, but not limited to, other PC- and computer-based systems.

Further, it will be understood by someone with ordinary skill in the art that an express customer-tracking request and/or customer payment and/or customer authorization are not limitations of the present invention. Rather, in an alternative embodiment, the CONFIRM® Service subscriber reseller mail piece tracking provider computer system could be programmed to automatically assign a unique mail piece tracking identifier to each mail piece processed by the system and provide tracking capabilities without extra charge to the user, or alternatively, could automatically assign a unique mail piece tracking identifier to mail pieces that meet particular selection/assignment criteria such as, for example, mail pieces for which postage in excess of some particular amount ($X) is purchased through the system. Such selection/assignment criteria could be programmed or data-driven or some combination thereof.

Figure 1:
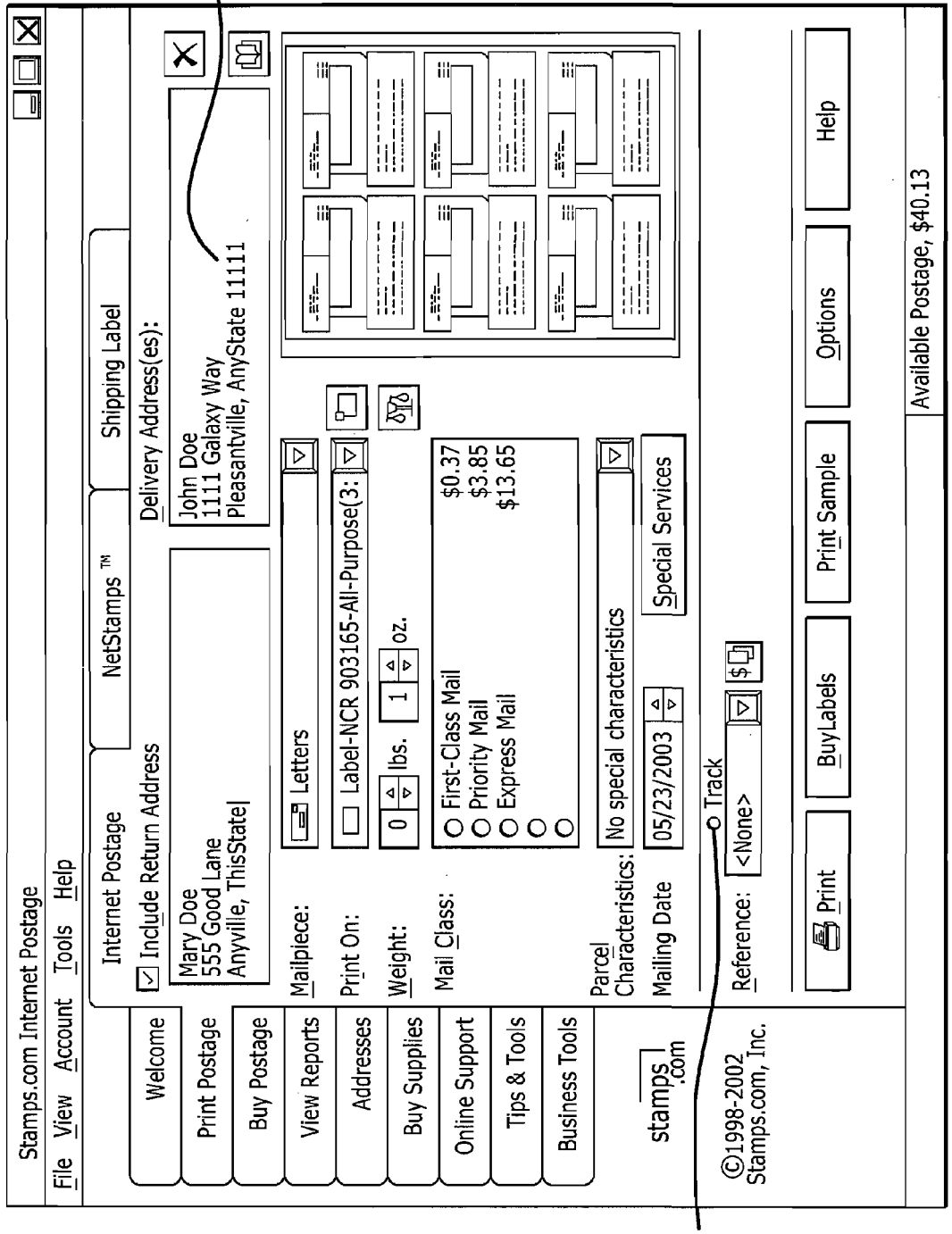
FIG. 1 is a graphic representation depicting an exemplary graphical user interface for obtaining a customer's request to assign a unique mail piece identifier to a particular mail piece in an exemplary embodiment of the present invention.

Returning with reference to the exemplary embodiment of the present invention, FIG. 1 is a graphic representation depicting an exemplary graphical user interface for obtaining a customer's request to assign a unique mail piece identifier to a particular mail piece in an exemplary embodiment of the present invention. In the exemplary interface depicted in FIG. 1, the customer requests that a particular mail piece for which the customer is printing Internet FIRST-CLASS postage be tracked by clicking an onscreen tracking option button 10.

It will be understood by someone with ordinary skill in the art that there are many ways and formats with which to capture a customer's online request for a service, varying from pull down menus of selectable services, to clicking or otherwise indicating a particular option presented on a graphical user interface; the exemplary graphical user interface is illustrative and non-limiting.

In the exemplary embodiment, when a customer requests that a particular, e.g., FIRST CLASS MAIL®, mail piece be tracked, a unique identifier is then assigned to the particular mail piece. The exemplary unique mail piece identifier comprises a specially assigned combination of a POSTNET Code and a PLANET™ Code such that, for a defined period of time, the POSTNET Code is unique within the PLANET™ Code. That is, for a particular period of time that is defined to the system, the assigned combination of the PLANET™ Code and POSTNET Code comprising the mail piece identifier is unique to the mail piece to which it is assigned. This exemplary unique mail piece identifier is referred to herein as a "composite CONFIRM® ID", "composite confirm ID" or "CCID."

Under the present data representation scheme and operational implementation by the USPS of the CONFIRM® service, PLANET™ Codes are 12- or 14-digit barcodes; the first two digits of a PLANET™ Code represent the type of CONFIRM® service: Destination CONFIRM® or Origin CONFIRM®. Under the present data representation scheme and operational implementation by the USPS of the CONFIRM® service, for Destination CONFIRM®, the next 9, or 11, digits of the PLANET™ Code comprise a 5-digit Subscriber ID that is a unique identifier of the particular CONFIRM® subscriber and a 4- or 6-digit field defined by the particular mailer to identify the actual mailing. The $12^{th}$, or $14^{th}$, digit, as the case may be, of the PLANET™ Code is a check-sum digit for error detection.

Under the present data representation scheme and operational implementation by the USPS of the CONFIRM® service, a POSTNET Code comprises a 5-digit ZIP code and, if the particular delivery address can be found in a postal address database, a 4-digit area code, and a 2-digit delivery address code. If the particular delivery address cannot be found in the postal address database, then, as long as the city, state and ZIP code of the delivery address are otherwise valid, the POSTNET Code comprises only the 5-digit ZIP code.

It will be understood by someone with ordinary skill in the art that description herein to the exemplary embodiment reference to PLANET™ Codes and/or POSTNET Codes is provided with reference to exemplary PLANET™ Codes and/or POSTNET Codes according to the present data representation schemes and operational implementation by the USPS of the CONFIRM® service. Such reference to exemplary PLANET™ Codes and/or POSTNET Codes according to the present data representation schemes and operational implementation by the USPS of the CONFIRM® service is not a limitation of the invention. Rather, the data representation scheme for PLANET™ Codes and/or POSTNET Codes could be varied without departing from the spirit of the present invention.

It will also be understood by someone of ordinary skill in the art that the present invention is not limited by the current data representation schemes, data representation technologies, and operational implementation by the USPS of the CONFIRM® service. Rather, the present invention will apply to other data representation schemes now known or in the future discovered, other data representation technologies now known or in the future discovered, and other operational implementations now known or in the future discovered, of the CONFIRM® service and other similar services. For example, in the present USPS implementation of the CONFIRM® service, and in an exemplary embodiment of the present invention described herein, PLANET™ Codes are represented by a 2-state barcode. The present invention is not limited to representation of PLANET™ Codes by a 2-state barcode. Rather, the present invention would apply to other types of barcodes, such as matrix, 3-state, 4-state barcodes, and various other types of barcodes and machine-readable technologies.

As will be understood by someone with ordinary skill in the art, a 2-state barcode encodes characters in a pattern of, e.g., four bars or five bars, per character; each 2-state barcode bar is either a tall bar or a short bar (i.e. two possible "states" for each bar). As will be understood by someone with ordinary skill in the art; bars of both lengths emanate in the same direction, e.g., upward, from a common horizontal line.

As will be understood by someone with ordinary skill in the art, a 3-state barcode uses a long bar and two types of short bars—one 3-state short bar emanates from the top down, and the other 3-state short bar emanates from the bottom up.

As will be understood by someone with ordinary skill in the art, a 4-state barcode uses four bar states. The four states are: tall bars, short bars, medium height bars that extend upward (ascender) from a middle track of the barcode symbol, and medium height bars that extend downward (descender) from the middle track of the barcode symbol. One 4-state barcode, called the Royal Mail 4-state Customer Code (RM4SCC), uses a combination of four bars, two ascenders and two descenders, to represent each character. It will be understood by someone with ordinary skill in the art that a 4-state barcode can be used to represent more information in the same amount of space occupied by a 2-state barcode.

Further, it will be understood by someone with ordinary skill in the art that the description of barcodes in the exemplary embodiment is illustrative of machine readable codes and symbologies and similar technologies, including barcodes, matrix codes, digital watermarks, conventional metered payment indicia from meters, magnetic strips, magnetic chips, and the like. The description of barcodes in the exemplary embodiment is not a limitation of the invention. As will be understood by someone with ordinary skill in the art, the present invention is not limited to machine-readable technologies described herein or now known, but would be equally applicable to machine readable technologies not now known or not described herein provided that the machine readable indicia provided by such technologies can be printed on, affixed to, deposited on, or otherwise displayed on or associated with a particular mailpiece.

Returning with reference to the exemplary embodiment, in the exemplary embodiment, the POSTNET Code for the exemplary POSTNET Code unique mail piece identifier is populated by the Internet Postage system with the appropriate 5-digit ZIP code, 4-digit area code, and 2-digit delivery address code fields obtained by the Internet Postage system in response to the customer's input of a delivery address 11.

It will be understood by someone with ordinary skill in the art that the composite CONFIRM® ID (CCID) need not necessarily include the entire POSTNET Code to uniquely identify a mail piece. It is possible to use less than the full POSTNET Code to construct a unique mail piece identifier. For example, 1, 2 or more digits of the POSTNET Code could be used to construct a unique CCID. The number of digits of the POSTNET Code that would be needed to construct a unique CCID mail piece identifier would depend on circumstances regarding a particular CONFIRM® Service subscriber and the number of its customers.

In order for the composite CONFIRM® ID to uniquely identify a particular mail piece, the composite CONFIRM® ID needs to be unique for a time period that is at least as long as, or exceeds, the time expected to be required for the mail piece to be delivered, and scanned. In the exemplary embodiment of the present invention, the uniqueness time period will be set to, e.g., 30, 60, 90 days, or some other particular time period defined in the system, or for certain types of mail, permanent.

As briefly previously mentioned above, the exemplary mail piece tracking provider is itself a CONFIRM® Service subscriber. As a CONFIRM® Service subscriber, the exemplary mail piece tracking provider registers with the U.S. Postal Service to obtain one or more subscriber identifiers (subscriber IDs). For non-limiting illustrative purposes only, three (3) exemplary subscriber IDs will be described herein, namely "01", "02" and "03." It will be understood by someone with ordinary skill in the art that more or less subscriber IDs could be used without departing from the spirit of the invention.

Continuing with FIG. 2, in the exemplary embodiment, when a customer of the exemplary mail piece tracking provider requests 20 that a particular mail piece be tracked, the exemplary Internet Postage computer system receives 21 the tracking request and charges 22 the customer, such as through a pre-established account balance, an amount of money appropriate for the tracking of the particular mail piece. The system checks in step 23 to determine whether or not tracking is authorized. If the customer declines to pay for the tracking service, the system returns 24 to its other processing. If the customer pays the requested amount, such as, e.g., by indicating authorization of the printing of an Internet Postage stamp and a tracking label, then the exemplary Internet Postage computer system builds and assigns 25 to the particular mail piece, a unique composite CONFIRM® ID (CCID); the system builds and stores 26 a CCID record with the assigned unique composite CONFIRM® ID, along with other information described in more detail below, in a memory 27, such as in a database or lookup table. The memory storage 27 of the assigned CCIDs is sometimes referred to herein, for non-limiting illustrative purposes, as the "CCID database" 27.

As previously mentioned, express user requests and payment in the exemplary embodiment is illustrative and non-limiting. In an alternative embodiment, the unique mail piece identifier could be automatically assigned to every mail piece, or alternatively, to particular mail pieces according to particular criteria; tracking could be provided without charge to the user.

Returning with reference to the exemplary embodiment depicted in FIG. 2, once the system has built and assigned a unique CCID to the particular mail piece, the system then encodes the CCID and prints 28 a mail piece tracking graphic symbology, that can be applied to the particular mail piece and that can then be scanned by the U.S. postal service. The general way in which data is encoded for printing as a graphic symbology is well known in the art. The particular requirements for encoding and printing a U.S. Postal CONFIRM® identifier is prescribed in U.S. Postal Service *Publication 197*, previously incorporated by reference herein for all purposes.

After encoding and printing 28 the mail piece tracking graphic symbology, the system returns 24 to its other processing.

Figure 3A:
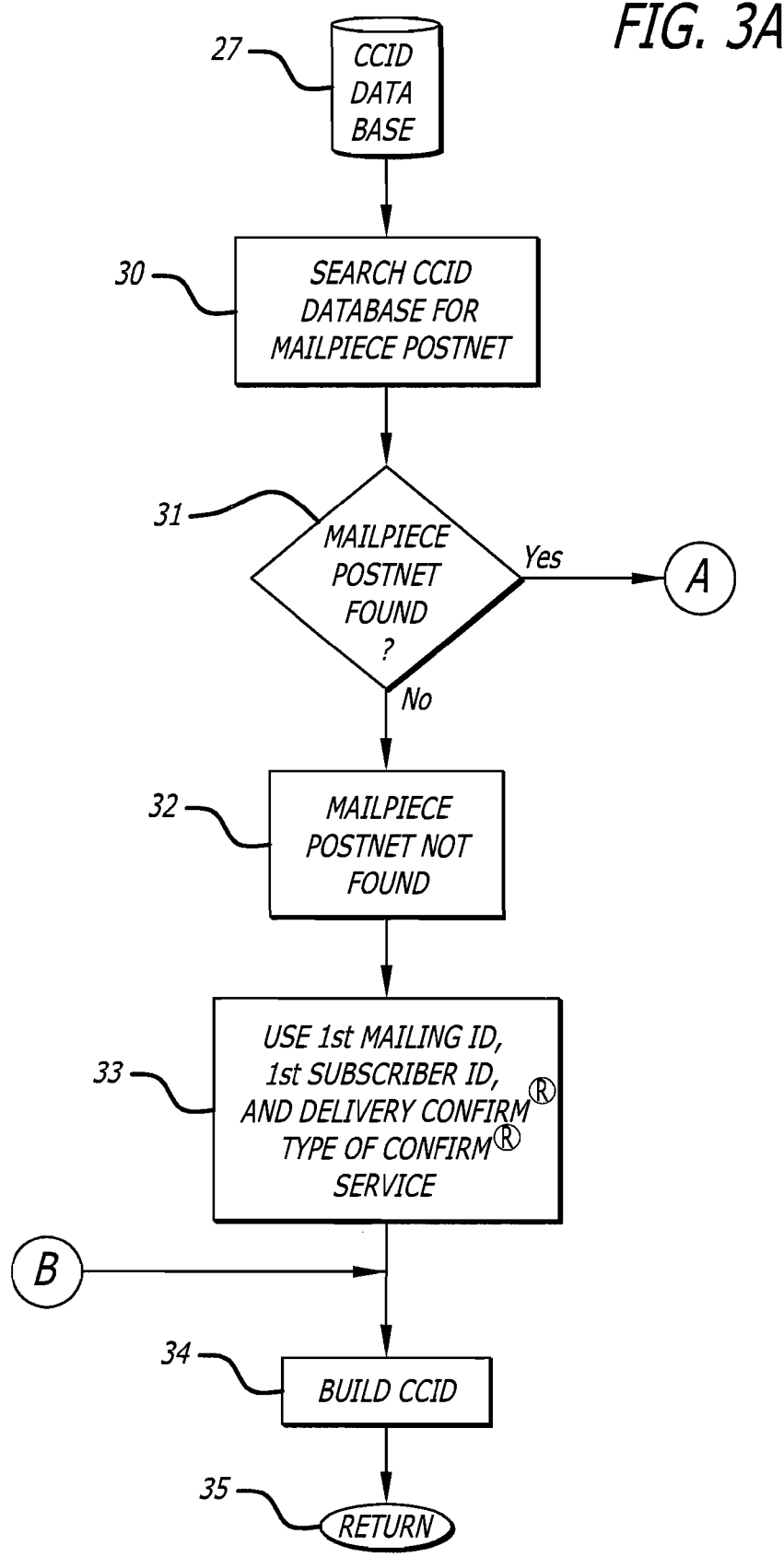
FIGS. 3A through 3B are a high level logic flow diagram depicting an exemplary process for building a unique mail piece identifier in an exemplary embodiment of the present invention.
Figure 3B:
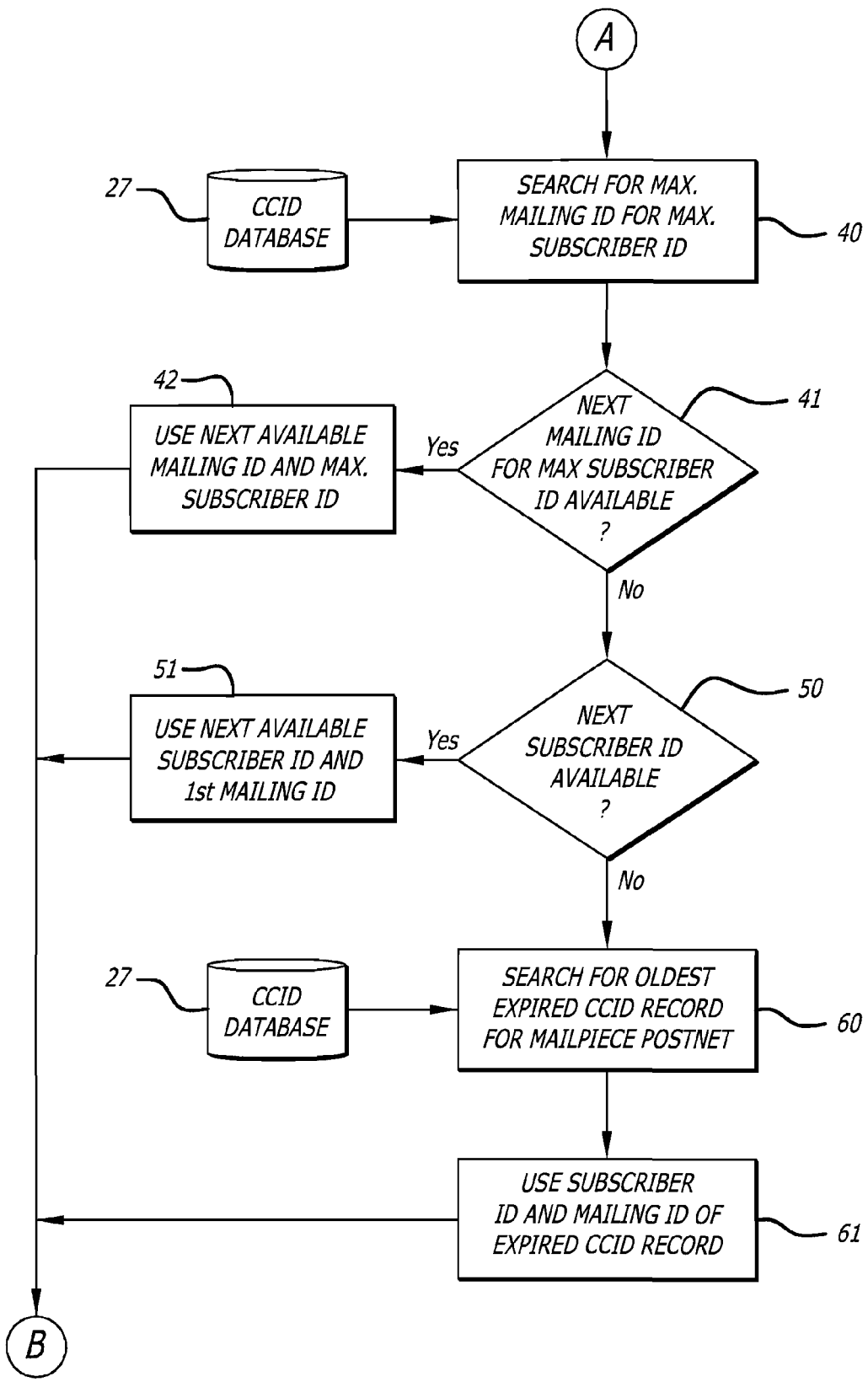

FIGS. 3A through 3B are a high level logic flow diagram depicting an exemplary process for building (see element 25 in FIG. 2) a unique mail piece identifier in an exemplary embodiment of the present invention. In order for the composite CONFIRM® ID to uniquely identify a particular mail piece, the exemplary Internet Postage computer system first searches 30 the CCID database 27 for a previously assigned composite CONFIRM® ID with the same POSTNET Code as the POSTNET Code of the particular mail piece for which unique identification has been requested by the customer. That is, the exemplary Internet Postage computer system uses as a lookup key the POSTNET Code of the particular mail piece for which tracking has been requested by the customer.

In one alternative embodiment, instead of using only the POSTNET Code as the lookup key, a combination of POSTNET Code and mail class/service type code is used as a lookup key. As a further alternative, a combination of POSTNET Code and subscriber ID could be used as a lookup key.

Continuing with FIGS. 3A through 3B, the exemplary Internet Postage computer system tests (test step 31, FIG. 3A) whether or not the mail piece POSTNET was found. If the POSTNET Code (or in the alternative embodiment, the combination of the POSTNET Code and mail class/service type code) does not exist 32 in the CCID database 27, then the exemplary Internet Postage computer system uses (in step 33) the first Mailing ID ("000001") and the first subscriber ID ("00001") to build 34 the unique composite CONFIRM® ID (CCID). The system then returns 35 to its other processing.

In the case in which the POSTNET Code (or in the alternative embodiment, the combination of the POSTNET Code and mail class/service type code) does not exist in the CCID database, in order to build the unique CCID, the exemplary Internet Postage computer system sets a first field (referred to herein as the "CCID type of CONFIRM® service") to a value designating that the CONFIRM® service type is "Destination" CONFIRM®. In the exemplary embodiment, the CCID type of CONFIRM® service field is a 2-digit field.

In the case in which the POSTNET Code (or in the alternative embodiment, the combination of the POSTNET Code and mail class/service type code) does not exist in the CCID database, in order to further build the unique CCID, the exemplary Internet Postage computer system sets a second field (referred to herein as the "CCID subscriber ID") in the CCID to a first subscriber ID, e.g., "00001". In the exemplary embodiment, the CCID subscriber ID is a 5-digit field.

The exemplary Internet Postage computer system sets a third field (referred to herein as the "CCID mailing ID") in the CCID to a first mailing ID, e.g., "000001". In the exemplary embodiment, the CCID mailing ID is a 6-digit field. In an alternative embodiment, the CCID mailing ID could be a 4-digit field or a field with some other "n" number of digits.

The exemplary Internet Postage computer system sets a fourth field (referred to herein as the "CCID POSTNET") in the CCID to the POSTNET Code of the particular mail piece for which the customer has requested tracking. In the exemplary embodiment system, the customer mailer will have requested and paid for an Internet-based postage-indicia-bearing label to be printed with which to mail the particular mail piece. In those instances in which the customer mailer has provided the delivery address or zip code for the particular mail piece in order for the system to prepare the Internet-based postage-indicia-bearing label for the mail piece, the system will use the Internet-based postage-indicia-bearing label delivery address information supplied by the customer mailer with which to populate the CCID POSTNET.

As previously explained, a POSTNET Code comprises a 5-digit ZIP code and, if the particular delivery address can be found in a postal address database, a 4-digit area code, and a 2-digit delivery address code. If the particular delivery address cannot be found in the postal address database, then, as long as the city, state and ZIP code of the delivery address are otherwise valid, the POSTNET Code comprises only the 5-digit ZIP code.

As previously explained, in the exemplary embodiment, the POSTNET Code for the exemplary POSTNET Code unique mail piece identifier is populated by the Internet Postage system with the appropriate 5-digit ZIP code, 4-digit area code, and 2-digit delivery address code fields obtained by the Internet Postage system in response to the customer's input of a delivery address 11.

As previously explained, it will be understood by someone with ordinary skill in the art that the composite CONFIRM® ID (CCID) need not necessarily include the entire POSTNET Code to uniquely identify a mail piece. It is possible to use less than the full POSTNET Code to construct a unique mail piece identifier. For example, 1, 2 or more digits of the POSTNET Code could be used to construct a unique CCID. The number of digits of the POSTNET Code that would be needed to construct a unique CCID mail piece identifier would depend on circumstances regarding a particular CONFIRM® Service subscriber and the number of its customers.

In the alternative exemplary embodiment in which the lookup key includes both the POSTNET Code and the mail class/service type code, the exemplary alternative Internet Postage computer system would also set a fifth field (referred to herein as the "CCID service type") in the CCID to the mail class/service type of the mail piece for which the customer has requested tracking.

Once the exemplary Internet Postage computer system (sometimes referred to herein as the "system") has built a CCID, such as is depicted in function blocks 33-34 of FIGS. 3A through 3B, to uniquely identify the mail piece to be tracked, the system builds a CCID record, as depicted in function block 26 in FIG. 2 for storage in the CCID database 27.

In building (function 26, FIG. 2) the CCID record, the system assigns a permanently unique "Print ID" to the just-built CCID and associates the Print ID with an identifier of the particular customer who requested tracking of the particular mail piece. The system then populates the CCID database record for storage with the following information: Print ID, CCID, Customer ID/Meter No., mailing date, time period required for uniqueness, print date (optional in some embodiments), amount of postage (optional in some embodiments), tracking fee (optional in some embodiments), and Mail Class/Service Type (optional in some embodiments). In one alternative embodiment, instead of storing in each CCID database record a time period during which the CCID must remain unique, the system would store an expiration date. Once the CCID database record has been built, the system stores the CCID database record in the CCID database.

As will be understood by someone with ordinary skill in the art, the above-identified data fields in what is referred to herein as the CCID database record are exemplary and non-limiting. In alternative embodiments, the CCID database record may contain links to other databases or tables in order to link the particular CCID database record to a particular customer.

Returning to FIGS. 3A through 3B, if the POSTNET Code (or in the alternative embodiment, the combination of the POSTNET Code and mail class/service type code) already exists in the CCID database 27, then the exemplary Internet Postage computer system must first determine the next available unique combination of the subscriber ID and Mailing ID in order to build the unique composite CONFIRM® ID (CCID).

In order to determine the next available unique combination of the subscriber ID and Mailing ID, the system will search 40 for the CCID database record for the given POSTNET Code (or in the alternative embodiment, the combination of the POSTNET Code and mail class/service type code) with the highest (maximum) subscriber ID and the highest (maximum) Mailing ID. Depending on the computer language and database technology used, the search may be initiated by an instruction to give the CCID database record with the lookup POSTNET Code (or in the alternative embodiment, the combination of the lookup POSTNET Code and mail class/service type code) having the maximum subscriber ID and the maximum Mailing ID.

Once the system returns the CCID database record with the lookup POSTNET Code (or in the alternative embodiment, the combination of the lookup POSTNET Code and mail class/service type code) having the maximum subscriber ID and the maximum Mailing ID, the system determines 41 whether the next Mailing ID is available for the maximum subscriber ID. If the next Mailing ID is available for the maximum subscriber ID, the system then uses 42 the next available (next increment of) Mailing ID for that maximum subscriber ID to build 34 the unique CCID, and then returns 35 to the system's other processing.

If the next available Mailing ID exceeds the maximum allowable number (in the exemplary embodiment, "999999"), and the next available Mailing ID is "000001", the system then determines 50 whether the next subscriber ID is available. If the next subscriber ID is available, the system then uses 51 the next available subscriber ID and the first ("000001") Mailing ID for that subscriber ID and builds 34 the unique CCID and then returns 35 to the system's other processing.

If when the system attempts to use the next available Mailing ID and subscriber ID, there are no more available Mailing IDs for existing subscriber IDs, then the system searches 60 for existing CCID database records for the lookup POSTNET Code (or in the alternative embodiment, the combination of the lookup POSTNET Code and mail class/service type code), for which the Mailing date for the particular mail piece to be tracked exceeds the expiration date for the CCID database record. The expiration date will be either stored in the CCID database record, or can be calculated by adding the time period required for uniqueness that is stored in the CCID database record to the mailing date that is stored in the CCID database record.

When an expired CCID database record is returned to the system in response to the search with the mail piece lookup POSTNET Code (or in the alternative embodiment, the combination of the lookup POSTNET Code and mail class/service type code), the system "recycles" the CCID (in function 61, FIG. 3B)—the system updates the returned expired CCID database record by populating the record with information about the new CCID and print event in order to build 34 the unique CCID before returning 35 to the system's other processing.

The CCID conforms with the U.S. Postal Service's requirements for a U.S. Postal CONFIRM® service identifier, while at the same time, the CCID provides, for a defined period of time, mail-piece-level uniqueness for mail piece tracking.

As was previously described above with regard to FIG. 2, once the system has built a CCID 25 and a CCID Record, and has stored 26 the CCID record on the CCID database 27, the system encodes the CCID for printing as a graphic symbology, and print the graphic symbology. In the exemplary embodiment of the present invention, the CCID-encoded graphic symbology is a barcode. In the exemplary embodiment, the system prompts the customer mailer to request a final indication by the customer mailer that the customer mailer is ready for the system to print the graphic symbology. Once the exemplary embodiment system receives the customer mailer's go-ahead to print, the exemplary embodiment system prints 28 the CCID-encoded barcode on a label, or directly on an envelope.

In an alternative exemplary embodiment of the present invention, an alternative approach is used to manage CCID life- and expiration-times. The alternative approach uses a first designated account group comprising a first set of subscriber IDs, e.g., subscriber ID 1, 2, and 3, for a designated first period of time, for example, 1-90 virtual relative calendar days. In this embodiment, a virtual relative calendar is used. According to the virtual relative calendar, the virtual relative calendar day is initialized to 0, and is then incremented by one for each real calendar day. During the first period of time, e.g., the first 90 virtual relative calendar days, of this alternative embodiment, the system would assign CCIDs with subscriber IDs from the first account group set of subscriber IDs, e.g., subscriber ID 1, 2, or 3. After the first period of time has expired, this alternative approach then uses a second designated account group comprising a second set of subscriber IDs, e.g., subscriber IDs 4, 5, and 6, for a designated second period of time, e.g., 91-180 virtual relative calendar days. During the second period of time, e.g., the 91-180 virtual relative calendar days, of this alternative embodiment, the system would assign CCIDs with subscriber IDs from the second account group set of subscriber IDs, e.g., subscriber ID 4, 5, or 6. After the second period of time expires, this alternative approach would then restart the virtual calendar to virtual relative calendar day zero and would begin again to assign CCIDs with subscriber IDs in the first account group.

It will be understood by someone with ordinary skill in the art that the description above of two account groups is illustrative and non-limiting; that the description above of each account group being comprised of three subscriber IDs is illustrative and non-limiting; and that the description above of a particular number of periods of time and of a particular number of days for each period of time is illustrative and non-limiting. More than two account groups could be used. Each account group could be comprised of more than three, or less than three, subscriber IDs. More than two periods of time could be used. And each time period could be set for more than 90 days, or less than 90 days. Further, each time period could be set for a different number of days relative to the number of days of each other time period.

In order to track the mail piece, before depositing the mail piece into the U.S. Postal Service mail stream, the customer mailer will affix the printed CCID-encoded barcode label to the mail piece on the delivery-address side of the mail piece in a position relative to the delivery address as specified and required by the U.S. Postal Service. The exemplary embodiment system instructs the customer mailer as to the proper placement of the CCID-encoded barcode label. In the alternative, the customer mailer will instruct the system to print, and the system will be programmed to format and print, the CCID-encoded barcode label directly on the mail piece envelope.

In the exemplary embodiment system, as described above, the customer mailer has requested and paid for the printing of one or more Internet-based postage-indicia-bearing labels, in some cases including a delivery address label, for affixing to the mail piece. In such case, the customer mailer will affix the Internet-based postage-indicia-bearing label(s), and, if applicable, the address label, and in some cases, a separate CCID-encoded barcode label.

Once a mail piece bearing a graphic symbology encoding a CONFIRM® service ID has been deposited in the U.S. Postal Service mail stream, the U.S. Postal Service will scan the mail piece at various stages of processing. Each time a CONFIRM® service ID graphic symbology-bearing mail piece is scanned by the U.S. Postal Service, the scanned information, along with details about the scanning event, are electronically captured. Each scan of a mail piece results in the creation of a record containing the following information: Shipment ID, Postal Service facility, Facility ID (ZIP), Date of entry scan (in mm/dd/yyyy format), and time of entry scan (in hh:mm:ss format). The Shipment ID from the scan data comprises the CONFIRM® service ID, which in the case of a mail piece to which a customer mailer has prepared the CONFIRM® label, or applied the CONFIRM® labeling directly to the mail piece envelope, as the case may be, using the exemplary embodiment system, comprises the CCID-encoded barcode.

Scanned data is made available to each CONFIRM® subscriber in more than one way. According to U.S. Postal Service *Publication* 197, the U.S. Postal Service can provide a subscriber with scanned information though File Transfer Protocol (FTP). The U.S. Postal Service also makes scanned information available via password-protected access of a Web site, www.planetcodes.com.

Figure 4:
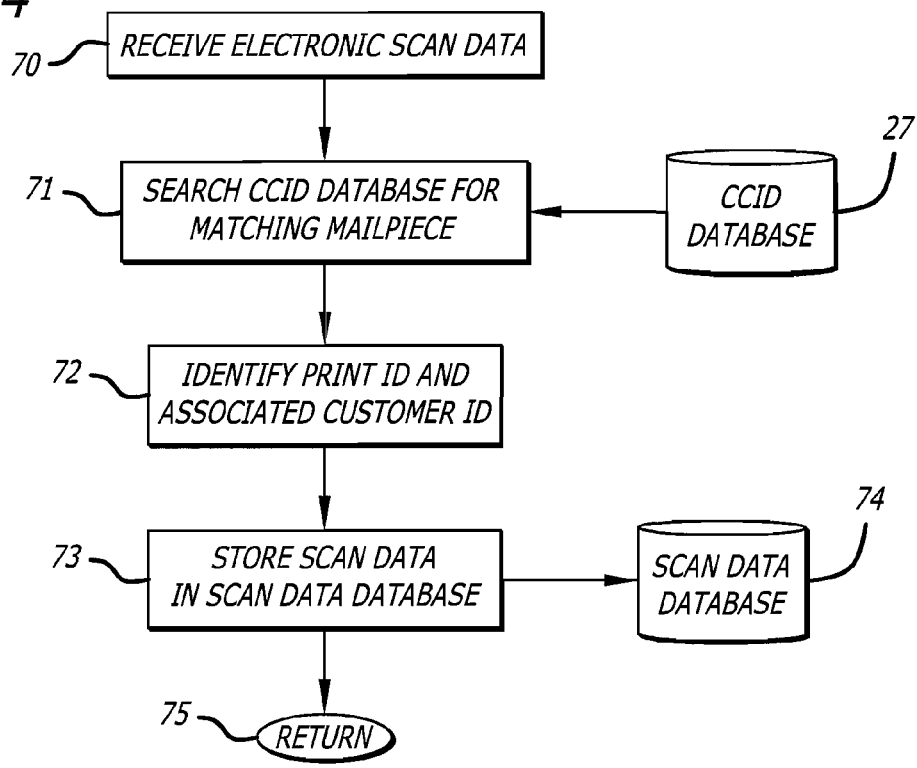
FIG. 4 is a high level logic flow diagram depicting an exemplary process for processing electronic scan data in an exemplary embodiment of the present invention.

FIG. 4 is a high level logic flow diagram depicting an exemplary process for processing electronic scan data in an exemplary embodiment of the present invention. As depicted in FIG. 4, the exemplary embodiment system receives 70 the electronic scan data from the U.S. Postal Service in one of the available ways. When the exemplary embodiment system receives electronic scan records, for each received electronic scan record, the system searches 71 the CCID database 27 to identify a non-expired CCID record matching the Shipment ID of the scanned record. When the exemplary embodiment system identifies a non-expired CCID record matching the Shipment ID of a particular scanned record, the system identifies 72 the Print ID, and the correlating customer mailer ID, associated with the CCID record. The system then stores 73 the electronic scan record, and associated Print ID and customer mailer ID information, in a scan data database 74 (also sometimes referred to herein as the TRACK-IT event table database) before returning 75 to other system processing.

It will be understood by someone with ordinary skill in the art that the databases identified herein and the database data relationships described herein could be configured in various ways; that the non-limiting exemplary databases identified and their configurations are provided for non-limiting illustrative purposes.

The exemplary system can report the scan data for a particular customer's mail piece in various ways. The exemplary system will ask the user before the time that the CCID mail piece tracking label is printed how the user wants to receive information about the mail piece status during processing and at delivery. Among other ways, the exemplary system will provide mail piece tracking status reporting via the following non-limiting exemplary types of reports: on a website, via email to the receiver and/or the sender, via a look-up from a print history of the Internet-based postage system, email notification of expected delivery, wireless notification of expected delivery, and phone look-up.

Figure 5:
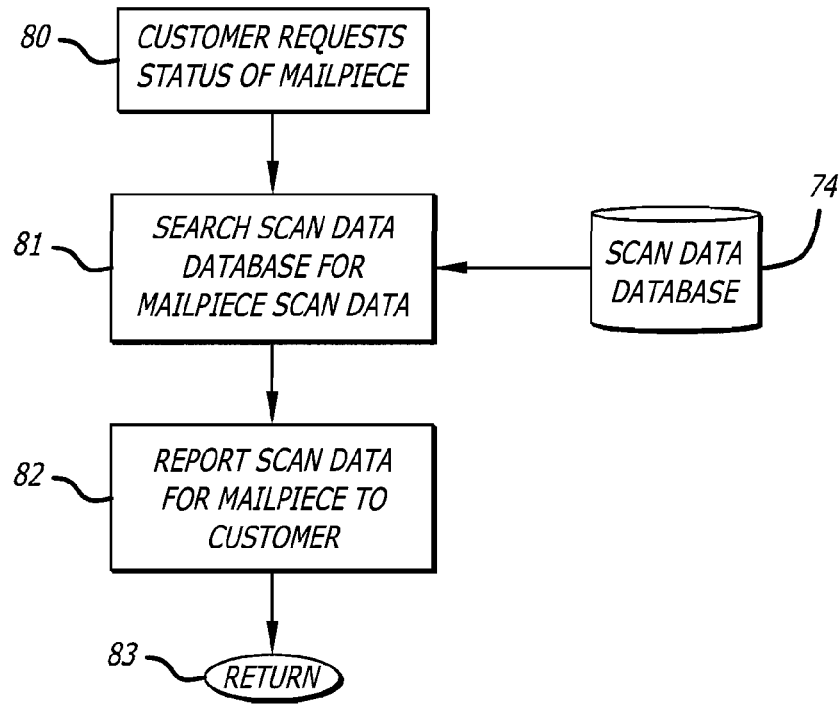
FIG. 5 is a high level logic flow diagram depicting an exemplary process for reporting mail piece tracking information to a customer.

FIG. 5 is a high level logic flow diagram depicting an exemplary process for reporting mail piece tracking information to a customer. As depicted in FIG. 5, when a customer requests 80 status of a particular mail piece, the system will search 81 the scan data database 74 for information about the particular mail piece. When the system locates information about the particular mail piece, the system will report 82 the mail piece status to the customer before returning 83 to other system processing. In the exemplary embodiment, the system will report all scan data received for that particular mail piece.

In addition to customer-based reporting, the system will also provide system-wide reporting, including, by non-limiting example: mass mailing reports of everything in the system, facility problem reports, reports of items that have never been scanned, reports of items that were scanned at least once, but have disappeared, average delivery time of mail pieces, average delivery time by region, and average delivery time by mail service class.

Figure 6:
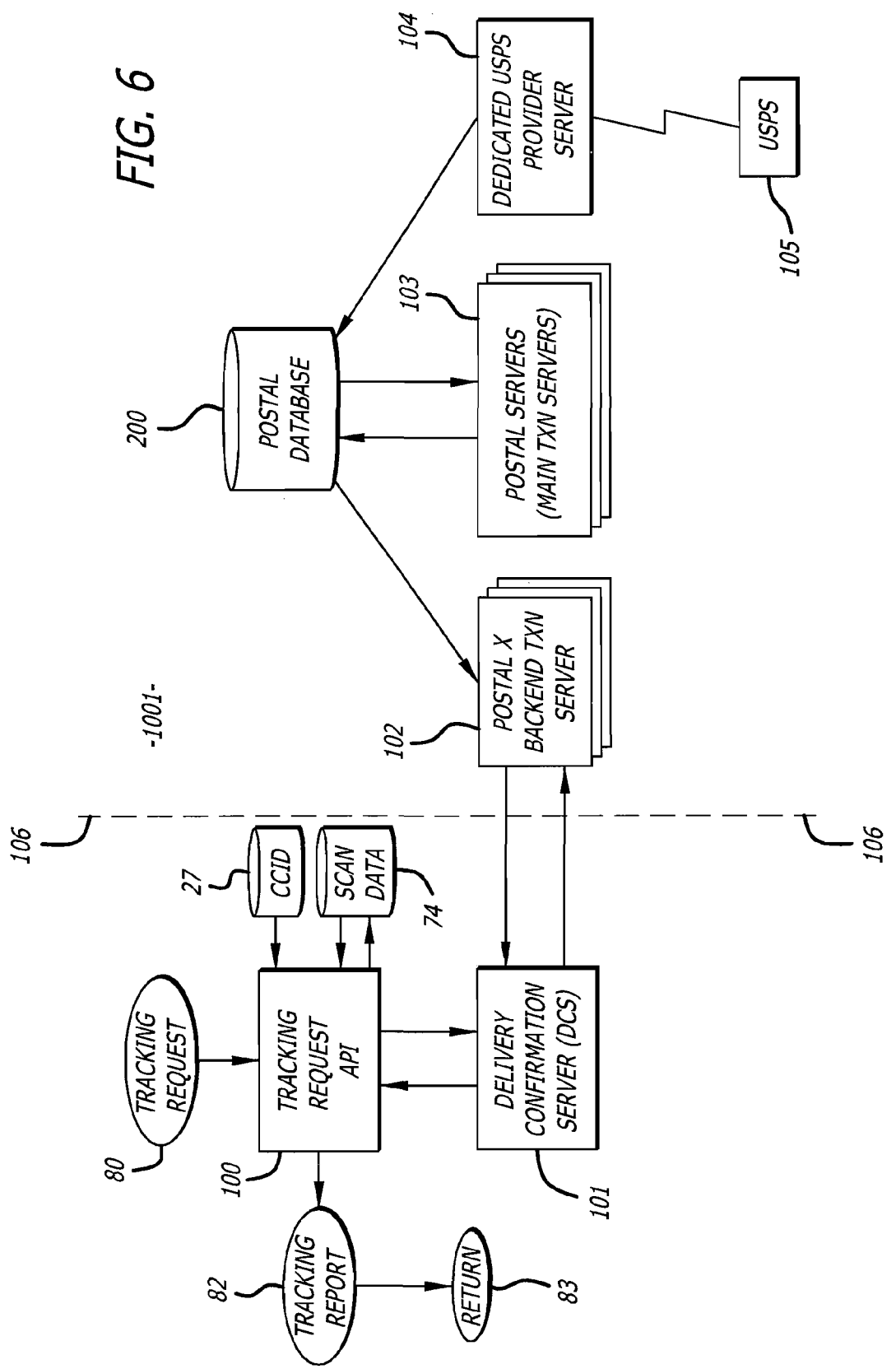
FIG. 6 is a block diagram depicting an exemplary configuration of server computers and a tracking applications program interface for facilitating tracking of mail pieces in an exemplary embodiment of the present invention.

FIG. 6 is a block diagram depicting an exemplary configuration of server computers and a tracking applications program interface for facilitating tracking of mail pieces in an exemplary embodiment of the present invention. FIG. 6 depicts in a server environment context an exemplary system configuration for processing mail piece tracking information and for reporting that information to a customer based on a specific tracking request.

As depicted in FIG. 6, one to a plurality of postal server computers 103 are provided. The postal server computers 103 serve as main transaction servers for the postal system 1001 (the system to the left of the dotted line 106-106). The postal server computers 103 access the postal database 200. The postal database 200 contains, among other things, information about each registered postal meter, registration information for each customer to which each respective postal meter is registered, CONFIRM® scan events, CONFIRM® exceptions, CONFIRM® fraud detection statistics, refund information, and other types of information. A dedicated USPS Provider Server 104 is provided for accessing a USPS system 105 provided by the USPS.

As depicted in FIG. 6, one to a plurality of postal X server computers 102 are provided. The postal X server computers 102 serve as backend transaction servers. The postal X server computers 102 respond to requests from transaction-specific type servers, such as a Delivery Confirmation Server 101.

The Delivery Confirmation Server 101 provides a tracking request Application Program Interface (API) 100. The tracking request API 100 is a program interface that receives and processes API requests comprising electronic objects of a particular type. Herein, reference to an API Server, or to API Servers, refers to one or more server computers that are programmed to perform various activities comprising particular API functions, including but not limited to receiving and translating various types of API requests and composing and transmitting various types of API responses to the appropriate party's system.

In the exemplary embodiment of the invention, the tracking request API 100 retrieves and processes tracking API requests in the form of XML (Extensible Markup Language) documents. XML is a markup language for electronic documents. A mark up language such as XML uses certain defined delimiters and tag names to designate meaning and/or organization of marked text within an electronic document. The use of XML is illustrative and non-limiting; languages other than XML could be used.

As depicted in FIG. 6, the exemplary system Tracking Request Applications Program Interface (API) 100 would process mail piece scan data, and would store mail piece scan data on the scan data database 74. The Tracking Request API 100 would respond to tracking requests 80 input by a user with a report 82 of mail piece tracking events.

In the exemplary embodiment of the present invention, computer postage for a mail piece for which the customer of the exemplary mail piece tracking provider has requested tracking (referred to herein as "Track-It postage") can be refunded if the user experiences printing problems. If a user experiences a Track-It postage printing problem, the exemplary system embodiment of the present invention will use the unique composite CONFIRM® ID (CCID) assigned to each mail piece to be tracked to prevent fraudulent refunds. The exemplary system embodiment will notify the user of criminal penalties for fraud.

In the exemplary embodiment of the present invention, the exemplary system embodiment will provide multiple ways in which a refund, or a reprint, can be requested and provided. One way will be to ask the user to confirm after each print of Track-It postage whether the print was successful; if the user indicates that the print was unsuccessful, the user will be given an option to either reprint the Track-It postage, or be refunded the amount of the Track-It postage.

A second way in which a refund, or a reprint, can be requested and provided in the exemplary embodiment will be to provide, for Track-It Postage items, an interactive Print History field for refund, and another interactive Print History field for reprint. The user can request to view the user's Print History. FIG. 7 is a graphic representation depicting an exemplary Print History report for a particular user in an exemplary embodiment of the present invention. In FIG. 7, a plurality of exemplary Print History report items are displayed. The first exemplary report item depicted in FIG. 7 comprises elements 1021-1 through 1028-1; the second exemplary report item depicted in FIG. 7 comprises elements 1021-2 through 1028-2; the third exemplary report item depicted in FIG. 7 comprises elements 1021-3 through 1028-3; and the fourth exemplary report item depicted in FIG. 7 comprises 1021-4 through 1028-4.

In the exemplary embodiment, the Print History report will be viewable online by the user. As depicted in FIG. 7, the exemplary Print History report will display the Current Date 1020. As depicted in FIG. 7, the exemplary Print History report will display, for each item of computer postage printed by the particular user, a Date Printed 1021 (for the four exemplary items listed in FIG. 7, 1021-1 through 1021-4), the Postmark Date 1022 (for the four exemplary items listed in FIG. 7, 1022-1 through 10224), the Addressee 1023 (for the four exemplary items listed in FIG. 7, 1023-1 through 10234), the Mail Class 1024 (for the four exemplary items listed in FIG. 7, 1024-1 through 1024-4) and to the extent to which any special options apply, Service Option 1029 (for the first three of the four exemplary items listed in FIG. 7, 1029-1 through 1029-3), the Postage amount 1025 (for the four exemplary items listed in FIG. 7, 1025-1 through 1025-4), the Weight 1026 of the item (for the four exemplary items listed in FIG. 7, 1026-1 through 1026-4), a possible interactive Reprint button 1027 (for the four exemplary items listed in FIG. 7, 1027-1 through 10274), and a possible interactive Refund button 1028 (for the four exemplary items listed in FIG. 7, 1028-1 through 10284).

The interactive Refund and Reprint buttons 1027, 1028, will be activated at an appropriate time within, and will remain active during, a certain period from the particular Postmark Date 1022 for the particular postage. For example, in the exemplary embodiment, a reprint may only be requested from the date the postage was printed (1021) until the Postmark Date 1022.

Therefore, as depicted in FIG. 7, the interactive Reprint button 1027-1 for the first listed postage item is shown as active (depicted with a solid outline) because the Current Date (MM/DD/YYYY (e.g., in MM/DD/YYYY month/day/year format wherein the particular month is depicted as "MM", the particular day is depicted as "DD", and the particular year is depicted is "YYYY")) 1020 is not greater than the Postmark Date (MM/DD/YYYY) 1022-1. In comparison, the Reprint button 1027-2 for the second listed postage item is shown as inactive (depicted with a dotted outline) because the Current Date (e.g., in MM/DD/YYYY format) 1020 is greater than the Postmark Date (e.g., in MM/01/YYYY format) 1022-2.

In the exemplary embodiment, a refund may not be requested until the Current Date is at least "DD"-1 days after the Postmark Date. The example "DD"-1 days for the exemplary refund period is a non-limiting variable example. For example, "DD" could be set in the system to be equal to 30 days. As depicted in FIG. 7, the interactive Refund button 1028-1 for the first listed postage item is shown as inactive (depicted with a dotted outline) because the Current Date (MM/DD/YYYY) 1020 is the same as, and is therefore not DD-1 days after, the Postmark Date (MM/DD/YYYY) 1022-1. In contrast, the interactive Refund button 1028-2 for the second listed postage item is shown as active (depicted with a solid outline) because the Current Date (MM/DD/YYYY) 1020 is DD-1 days after the Postmark Date (MM/01/YYYY) 1022-2.

In the exemplary embodiment, a refund may not be requested through the Print History report unless the TRACK-IT service option was requested. For example, in the Printed History report depicted in FIG. 7, the Reprint and Refund buttons 1027-4, 1028-4 respectively, for the fourth item listed are both shown as inactive (depicted with a dotted line) because the TRACK-IT option was not requested (or paid for).

A third way in which a refund, or a reprint, can be provided by the exemplary embodiment will be if the system detects a printing problem. In such case, the system will automatically issue a refund to the user's account and will display an error message to the user.

Figure 8A:
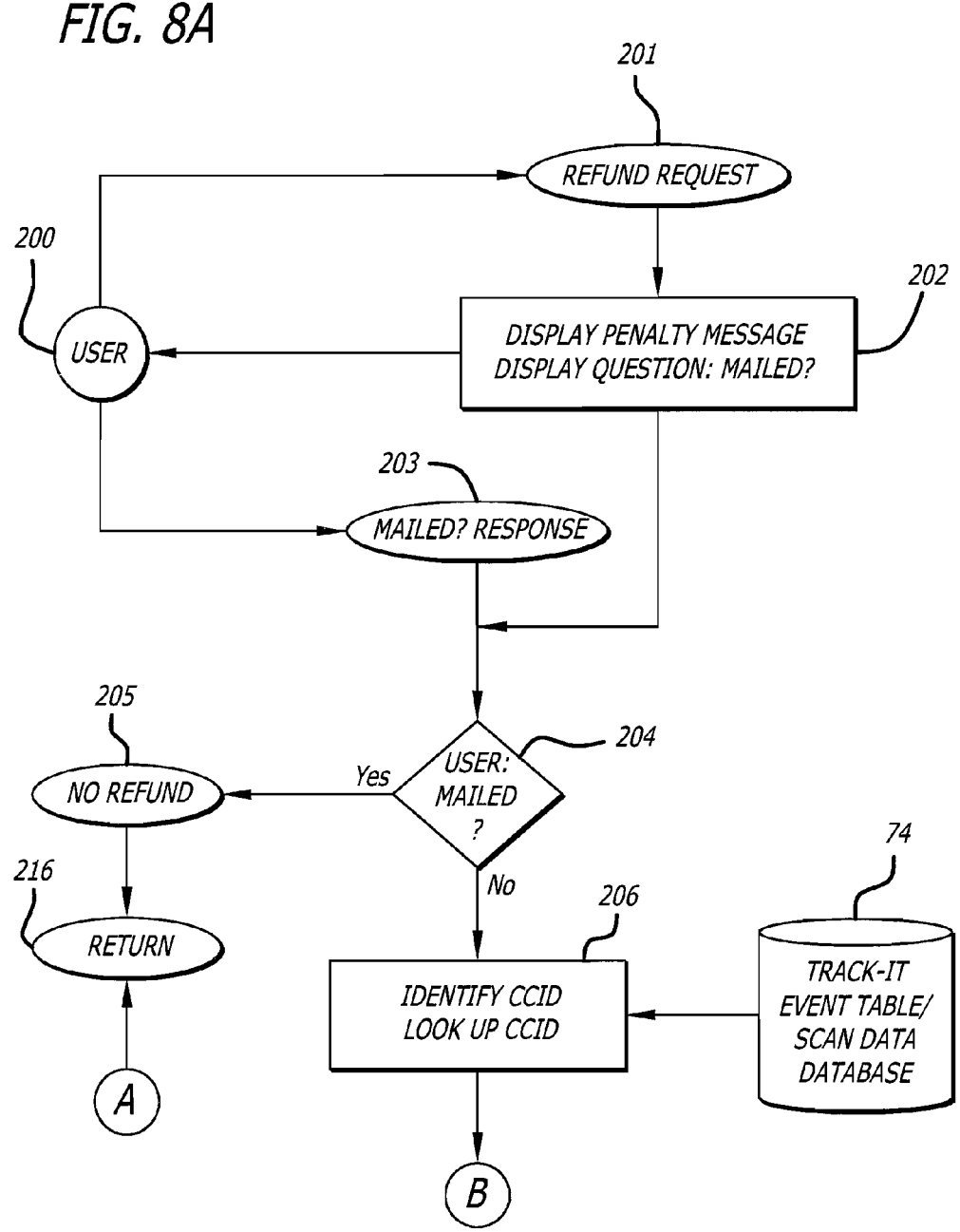
FIGS. 8A through 8B are a high level flow diagram depicting high level exemplary Refund functions in the exemplary system embodiment of the present invention.
Figure 8B:
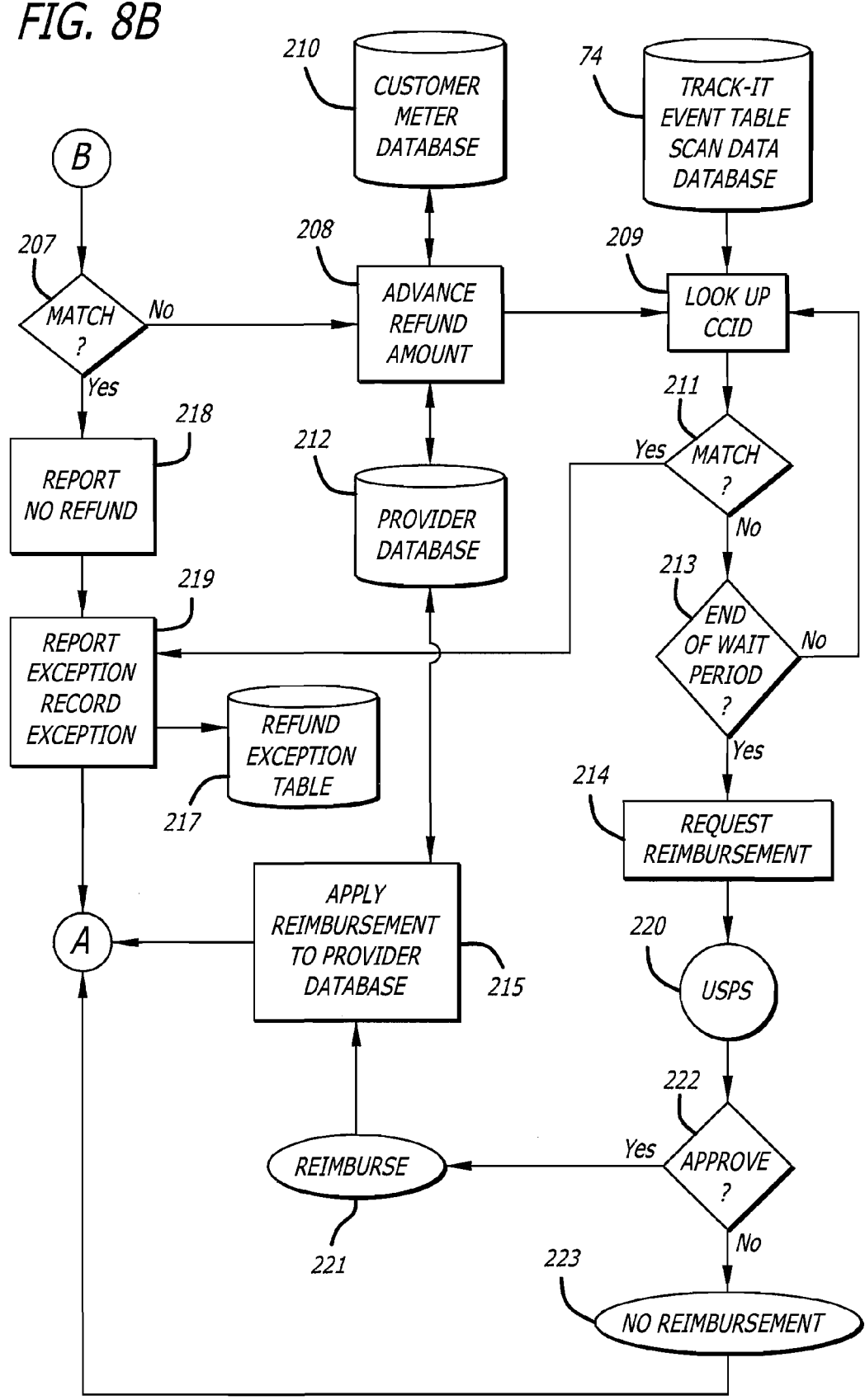

FIGS. 8A through 8B are a high level flow diagram depicting high level exemplary Refund functions in the exemplary system embodiment of the present invention. As depicted in FIGS. 8A through 8B, when a user 200 requests a refund 201, the exemplary system embodiment will, as depicted in function block 202, notify the user 200 that criminal penalties exist for fraudulent application for postage refunds and will ask the user whether or not the user has mailed the mail piece. The exemplary system embodiment will require, and will receive, the user's 200 response 203 to the has-the-mail-piece-been-mailed question. The exemplary system embodiment will test 204 the user's response 203 to the has-the-mail-piece-been-mailed question.

If the user responds that the mail piece and the claimed misprinted postage have been mailed, then the exemplary system embodiment will decline to issue the refund 205 and will return 216 such as to perform other functions.

If, on the other hand, the user responds that the mail piece and the claimed misprinted postage have not been mailed, then, as depicted in function block 206 in FIGS. 8A through 8B, the exemplary system embodiment will identify the CCID associated with the claimed misprinted postage and will query the to-date TRACK-IT event table/scan data database 74 to look-up the CCID.

The exemplary system embodiment would, as depicted in test function 207, test to determine whether the query 206 of the to-date TRACK-IT event table/scan data database 74 resulted in a match.

If the exemplary system embodiment does not locate any scan record for the CCID for the claimed misprinted postage, then the exemplary system embodiment would advance 208 a postage refund amount equal to the postage amount paid by the user for the claimed misprinted postage (sometimes referred to herein as the "refunded CCID" or the "refunded CCID postage")- to advance 208 the refund, the exemplary system embodiment would reduce the provider's account by the amount of the refund advance. In order to reduce the provider's account by the amount of the refund advance, the exemplary system embodiment would retrieve information for the provider's account from the Provider Database 212, would reduce the amount in the provider's account by the amount of the refund advance, and would store the updated, reduced amount in the Provider Database 212. In order to advance 208 the refund, the exemplary system embodiment would update the balance in the customer's postage meter. In order to update the balance in the customer's postage meter, the exemplary system embodiment would retrieve information concerning the customer's postage meter from the Customer Meter Database 210, would increase the amount in the customer's postage meter, and would store the updated postage meter amount for the customer in the Customer Meter Database 210.

If, on the other hand, the exemplary system embodiment locates one or more scan data records with a CCID corresponding to the refunded CCID, then the claimed misprinted postage entered the postal stream—that is, the postage was used on a mail piece that entered the postal stream. If the exemplary system embodiment locates one or more scan records for the CCID, then the exemplary system embodiment would report to the user that no refund 218 will be issued; the exemplary system embodiment, as depicted in function 219, would report the exception to the user, and in some embodiments, would report the exception to the U.S. Postal Service, and would record the exception in a Refund Exception Table 217.

In some embodiments, when a user requests a refund, the system will query (not shown) the Refund Exception Table 217 to determine whether or not the user has previously requested refunds for mail pieces that have been detected as having entered the mail stream. In such embodiments, a certain number of such prior requests will give rise to a block to that user being electronically issued any further refunds.

In order to obtain reimbursement to the computer postage service provider of the refund advance provided to the user, the exemplary system embodiment will periodically re-query the to-date TRACK-IT event table/scan data database and at the end of a predetermined wait period, such as, for example, sixty (60) days. The TRACK-IT event table/scan data database query will be date-sensitive so that only non-expired CCID records will be examined for a match with the refunded CCID. Therefore, after advancing the refund 208, the exemplary system embodiment will continue to periodically look up 209 the CCID in the scan data database 74, test for a match 211, and repeat the lookup 209 until the expiration of a certain period of time 213.

If at any time during the post-refund-advance time period, a scan event for the CCID is discovered by the test function 211 on the scan data database 74, the exemplary system embodiment would, as depicted in function 219, report the exception to the user, and in some embodiments, would report the exception to the U.S. Postal Service, and will record the exception in a Refund Exception Table 217. If the query finds a scan data record with a Shipment ID containing a CCID corresponding to the refunded CCID, then the claimed misprinted postage entered the postal stream—that is, the postage was used on a mail piece that entered the postal stream.

If, through the entire predetermined post-refund-advance wait period, no refund exception is encountered for the particular refunded CCID postage in the test function 211, then the exemplary system embodiment would report the refund advance to the U.S. Postal Service and request reimbursement 214 from the USPS 220. If the USPS approves the refund reimbursement in test function 222, the USPS 220 would issue a reimbursement 221 that the exemplary system embodiment would apply 215 to the provider account in the Provider Database 212 before completing the refund process to return 216 such as to perform other functions. If the USPS 220 does not approve the refund reimbursement in test function 222, then the USPS will notify in function 223 the exemplary system embodiment and/or the service provider that no reimbursement will be issued for the requested refunded CCID and will then return 216 such as to perform other functions.

It will be understood by someone with ordinary skill in the art that the databases identified herein and the database data relationships described herein could be configured in various ways; that the non-limiting exemplary databases identified and their configurations are provided for non-limiting illustrative purposes.

Trademarks

CONFIRM®, PRIORITY MAIL®, STANDARD MAIL®, and FIRST-CLASS MAIL® are registered trademarks of the United States Postal Service. PLANET™ and associated logos are trademarks of the United States Postal Service. The names of actual companies and products mentioned herein may be the trademarks of their respective owners.

Facsimile Reproduction of Copyright Material

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A method using a computer-based postage system for handling printing errors in the computer-based postage system, said method comprising:

generating an identifier in accordance with an authorization of a first class mail piece tracking provider of the computer-based postage system by a postal authority, said authorization to generate machine-readable tracking graphic symobolgies that are separate from postage indicia, for tracking first class mailings that bear machine-readable tracking graphic symbologies created in accordance with the authorization by the postal authority to the first class mail piece tracking provide, said authorization coupled with an agreement by the postal authority to scan said machine-readable tracking graphic symobolgies that are separate from postage indicia, said identifier to be associated with a particular first-class mail piece in response to a request by a particular mailer for tracking the particular first-class mail piece, wherein said identifier comprises a trackable mail piece identifier that trackably identifies the particular first-class mail piece during a particular period of time according to said authorization, wherein said trackable mail piece identifier is related to a particular mailer, and wherein said trackable mail piece identifier comprises:

a mailing subscriber identifier assigned by the postal authority to the first class mail piece tracking provider in accordance with the authorization of the first class mail piece tracking provider, a mailing identifier, and a delivery address identifier, wherein a combination of the mailing subscriber identifier, the mailing identifier, and the delivery address identifier is unique for a particular period of time;

generating for printing at a print-rendering device associated with a remote computer operable by the particular mailer, a printable representation of a postage indicium for the particular first-class mail piece, and a separate printable representation of a machine-readable tracking graphic symbology comprising an encoding of the trackable mail piece identifier;

receiving a request from the particular mailer for a refund for an amount of money corresponding to the postage indicium;

searching a database of scanned machine-readable tracking graphic symbologies comprising encoded identifiers provided by the postal authority for a match between a scanned machine-readable tracking graphic symbology comprising an encoded identifier and the trackable mail piece identifier, wherein each scanned machine-readable tracking graphic symbology comprising an encoded identifier in the database, comprises an indication of a scanning by the postal authority of a corresponding first class mail piece during mail stream processing by the postal authority; and for a trackable mail piece identifier for which no match is found, crediting an account associated with the particular mailer for the amount of money corresponding to the postage indicium.

2. The method of claim 1, said method further comprising: for a trackable mail piece identifier for which a match is found, refusing the request for a refund.

3. The method of claim 1, said method further comprising: for a trackable mail piece identifier for which no match is found, debiting an account for a postage provider for the amount of money corresponding to the postage indicium.

4. The method of claim 1 wherein the combination of the mailing subscriber identifier, the mailing identifier, and the delivery address identifier is unique for a particular period of time.

5. The method of claim 1 wherein the delivery address identifier is obtained from Internet-based postage delivery address information.

6. The method of claim 1 wherein the trackable mail piece identifier further comprises:
a service type identifier.

7. The method of claim 6 wherein the combination of the service type identifier, the mailing subscriber identifier, the mailing identifier, and the delivery address identifier is unique for a particular period of time.

8. A method using a computer-based postage system for handling printing errors in the computer-based postage system, said method comprising:
generating an identifier to be associated with a particular first-class mail piece in accordance with an authorization of a first class mail piece tracking provider of the computer-based postage system by a postal authority, said authorization to generate machine-readable tracking graphic symobolgies that are separate from postage indicia, for tracking first class mailings that bear at least one machine-readable tracking graphic symbology created in accordance with the authorization by the postal authority to the first class mail piece tracking provider, said authorization coupled with an agreement by the postal authority to scan said machine-readable tracking graphic symobolgies that are separate from postage indicia, wherein said identifier comprises a trackable mail piece identifier that trackably identifies the particular first-class mail piece during a particular period of time according to said authorization, and wherein said trackable mail piece identifier comprises a mailing subscriber identifier assigned by the postal authority to the first class mail piece tracking provider in accordance with the authorization of the first class mail piece tracking provider, a mailing identifier, and a delivery address identifier, and wherein a combination of the mailing subscriber identifier, the mailing identifier, and the delivery address identifier is trackably unique;
relating the trackable mail piece identifier to a particular mailer;
generating for printing at a print-rendering device associated with a remote computer operable by the particular mailer, a printable representation of a postage indicium for the particular mail piece, and a separate printable representation of a machine-readable tracking graphic symbology comprising an encoding of the trackable mail piece identifier, the postage indicium corresponding to an amount of money;
recognizing on a request date, an indication by the particular mailer that an error occurred in a printing of the postage indicium;
comparing the request date to a postage indicium print date and to an intended postage indicium postmark date that has been indicated by the particular mailer to the computer-based postage system;
if the request date is on or after the postage indicium print date and earlier than the postage indicium postmark date, allowing the particular mailer to request a reprint of the representation of the postage indicium; and
if the request date is on or after the postage indicium postmark date, allowing the particular mailer to request a refund of the amount of money corresponding to the postage indicium.

9. The method of claim 8, said method further comprising:
said allowing the particular mailer to request a refund comprising:
receiving a refund request from the particular mailer for a refund of the amount of money corresponding to the postage indicium,
in response to receiving the refund request, searching a plurality of electronic representations provided by the postal authority for a match with the separate, trackable first-class mail piece identifier that was generated for the particular first-class mail piece, and
if a match is found, refunding the amount of money to an account associated with the particular mailer.

10. The method of claim 8, said method further comprising:
wherein if the request date is on or after the postage indicium print date and earlier than the postage indicium postmark date, said allowing the particular mailer to request a reprint of the representation of the postage indicium comprises:
receiving a reprint request from the particular mailer to reprint the representation of the postage indicium, and
regenerating for printing at the print-rendering device associated with the remote computer operable by the particular mailer, the printable representation of a postage indicium for the particular first-class mail piece and the separate printable representation of the machine-readable tracking graphic symbology comprising an encoding of the trackable mail piece identifier.

11. The method of claim 8 wherein the combination of the mailing subscriber identifier, the mailing identifier, and the delivery address identifier is unique for the particular period of time.

12. A method using a computer-based postage system for handling printing errors in the computer-based postage system, said method comprising:
receiving a postage printing request from a particular mailer for mailing a particular first-class mail piece, said postage printing request comprising a delivery address;
formulating a trackable mail piece identifier in accordance with an authorization of a first class mail piece tracking provider of the computer-based postage system by a postal authority, said authorization to generate machine-readable tracking graphic symobolgies that are separate from postage indicia, for tracking first class mailings that bear at least one machine-readable tracking graphic symbology created in accordance with the authorization by the postal authority to the first class mail piece tracking provider, said authorization coupled with an agreement by the postal authority to scan said machine-readable tracking graphic symobolgies that are separate from postage indicia, said trackable mail piece identifier trackably identifying the particular first-class mail piece, said trackable mail piece identifier comprising: a mailing subscriber identifier assigned by the postal authority to the first class mail piece tracking provider in accordance with the authorization of the first class mail piece tracking provider, a mailing identifier; and delivery address information, wherein a combination of the mailing subscriber identifier, the mailing identifier, and the delivery address information is trackably unique for a particular period of time;
relating the trackable mail piece identifier to the particular mailer and to the particular first-class mail piece;
printing a postage indicium in accordance with the postage printing request, the postage indicium corresponding to an amount of money;
receiving on a request date, a request from the particular mailer for a history listing of postage indicia previously printed by the particular mailer;

comparing the request date to a postage indicium print date and to a postage indicium postmark date for each postage indicium previously printed by the particular mailer;

if the request date is on or later than the postage indicium print date for a particular postage indicium, and earlier than the postage indicium postmark date for the particular postage indicium, generating a listing of the particular postage indicium comprising an interactive field for requesting a reprint of the particular postage indicium and in response to an indication in the interactive field for requesting a reprint of a request to reprint, reprinting a replacement postage indicium corresponding to the amount of money; and if the request date is on or later than the postage indicium postmark date for the particular postage indicium, generating a listing of the particular postage indicium comprising an interactive field for requesting a refund of the amount of money corresponding to the particular postage indicium, and in response to an indication in the interactive field for requesting a refund of a request for a refund, crediting an account associated with the particular mailer for the amount of money.

13. The method of claim 12 wherein the combination of the mailing subscriber identifier, the mailing identifier, and the delivery address information is unique for a particular period of time.

14. The method of claim 12, said method further comprising:

if the request date is on or later than the postage indicium print date for the particular postage indicium and earlier than the postage indicium postmark date for the particular postage indicium, and if the particular mailer enters a selection in the interactive field for requesting a reprint of the postage indicium, reprinting the postage indicium; and if the request date is on or later than the postage indicium postmark date for the particular postage indicium, and if the particular mailer enters a selection in the interactive field for requesting a refund of the amount of money corresponding to the postage indicium, refunding the amount corresponding to the postage indicium to an account associated with the particular mailer.

15. A method using a computer-based postage system for processing refund requests for paid computer-based postage, said method comprising:

in response to a request on a particular print-request date by a particular mailer for first-class postage indicium for mailing a particular first class mail piece by an intended postmark date, using the computer-based postage system for generating on the particular print-request date said first-class postage indicium for an amount of money, and for further generating on the particular print-request date a corresponding separate, trackable first-class mail piece identifier in accordance with an authorization of a provider of the computer-based postage system by a postal authority to generate trackable identifiers for first-class mail pieces that are separate from postage indicia, wherein said intended postmark date is on or later than the particular print-request date, and wherein said corresponding separate trackable first-class mail piece identifier is trackably unique for a particular period of time;

in response to a subsequent request by a particular mailer on a particular refund-request date for a refund of the amount of money for said first class postage indicium:

comparing the particular refund-request date to the intended postmark date, if the particular refund-request date is on or later than the intended postmark date, searching a plurality of electronic representations provided by the postal authority for a match with the corresponding separate, trackable first-class mail piece identifier, wherein each electronic representation of the plurality of electronic representations corresponds to a machine-sensing during mail stream processing by the postal authority of a machine-readable graphic symbology on a first-class mail piece, wherein the machine-readable graphic symbology comprises a representation of a trackable identifier applied to a first-class mail piece separately from first-class mail piece postage indicia on the first-class mail piece, for a match between the corresponding separate, trackable first-class mail piece identifier corresponding to the postage indicia and a representation of a trackable identifier, denying the request by the particular mailer for the refund of the amount of money, and for the corresponding separate, trackable first-class mail piece identifier for which no match is found, crediting an account associated with the particular mailer with the amount of money.

16. The method of claim 15, wherein the trackable first-class mail piece identifier comprises a composite confirm identifier.

17. The method of claim 15, wherein the machine-readable graphic symbology comprises a four-state barcode.

18. The method of claim 8, wherein the machine-readable tracking graphic symbology comprises a four-state barcode.

* * * * *